(12) United States Patent
O

(10) Patent No.: US 11,056,173 B2
(45) Date of Patent: Jul. 6, 2021

(54) SEMICONDUCTOR MEMORY DEVICE AND MEMORY MODULE INCLUDING THE SAME

(71) Applicant: Samsung Electronics Co., Ltd., Suwon-si (KR)

(72) Inventor: Seong-Il O, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 97 days.

(21) Appl. No.: 16/138,086

(22) Filed: Sep. 21, 2018

(65) Prior Publication Data

US 2019/0198082 A1 Jun. 27, 2019

(30) Foreign Application Priority Data

Dec. 21, 2017 (KR) .................. 10-2017-0176887

(51) Int. Cl.
| | | |
|---|---|---|
| G11C 11/408 | (2006.01) | |
| G06F 21/72 | (2013.01) | |
| G11C 7/10 | (2006.01) | |
| G06F 3/06 | (2006.01) | |
| G06F 21/60 | (2013.01) | |
| H04L 9/08 | (2006.01) | |

(52) U.S. Cl.
CPC ............ *G11C 11/408* (2013.01); *G06F 3/062* (2013.01); *G06F 21/602* (2013.01); *G06F 21/72* (2013.01); *G11C 7/1006* (2013.01); *H04L 9/0822* (2013.01)

(58) Field of Classification Search
CPC ........ G06F 21/602; G06F 21/72; G06F 3/062; H04L 9/0822; G11C 7/1006; G11C 11/408

USPC ........................................................ 713/190
See application file for complete search history.

(56) References Cited

U.S. PATENT DOCUMENTS

| | | | | |
|---|---|---|---|---|
| 5,638,444 A | * | 6/1997 | Chou ................ | H04L 9/0822 380/284 |
| 5,825,878 A | * | 10/1998 | Takahashi ............. | G06F 21/79 713/190 |
| 6,081,895 A | * | 6/2000 | Harrison ................ | G06F 21/72 380/28 |

(Continued)

FOREIGN PATENT DOCUMENTS

| | | |
|---|---|---|
| CN | 100533459 C | 8/2009 |
| JP | 2009529745 A | 8/2009 |

OTHER PUBLICATIONS

NPL Search Terms (Year: 2021).*

(Continued)

*Primary Examiner* — Syed A Zaidi
(74) *Attorney, Agent, or Firm* — Muir Patent Law, PLLC

(57) ABSTRACT

A semiconductor memory device includes a memory core including a plurality of memory cells, an on-chip processor and a memory security controller. The on-chip processor performs on-chip data processing. The memory security controller decrypts encrypted data provided from the memory core or from a memory controller and to provide the decrypted data to the on-chip processor and encrypts result data from the on-chip processor to provide result-encrypted data to the memory core or the memory controller. Data processing efficiency may be enhanced without degradation of data security by decrypting the encrypted data in the semiconductor memory device to perform the on-chip data processing.

20 Claims, 24 Drawing Sheets

(56) References Cited

U.S. PATENT DOCUMENTS

| | | | | |
|---|---|---|---|---|
| 6,289,455 B1* | 9/2001 | Kocher | G06Q 20/367 | 380/228 |
| 7,278,016 B1* | 10/2007 | Detrick | G06F 21/602 | 380/44 |
| 7,694,152 B2* | 4/2010 | Carr | G06F 21/72 | 713/166 |
| 7,783,898 B2* | 8/2010 | Detrick | H04L 9/0861 | 380/44 |
| 7,925,013 B1* | 4/2011 | Washington | G06F 21/72 | 380/239 |
| 7,966,296 B2* | 6/2011 | Isobe | G06F 16/10 | 707/661 |
| 8,386,797 B1* | 2/2013 | Danilak | G06F 21/79 | 713/164 |
| 8,489,836 B2* | 7/2013 | Gremaud | G06F 21/79 | 711/163 |
| 8,571,221 B2* | 10/2013 | Little | G06F 21/72 | 380/264 |
| 8,577,031 B2* | 11/2013 | Asperger | G06F 21/71 | 257/679 |
| 8,595,806 B1* | 11/2013 | Gabrielson | H04L 63/0853 | 709/204 |
| 8,736,626 B2* | 5/2014 | Ostiguy | H04N 5/913 | 345/531 |
| 8,793,803 B2* | 7/2014 | Henry | G06F 21/72 | 726/26 |
| 8,819,839 B2* | 8/2014 | Henry | G06F 21/74 | 713/194 |
| 8,913,740 B2 | 12/2014 | Gueron et al. | | |
| 8,930,714 B2* | 1/2015 | Glew | G06F 21/606 | 713/190 |
| 9,021,557 B2* | 4/2015 | Leneel | G06F 21/606 | 726/4 |
| 9,026,719 B2* | 5/2015 | Hyde | G06F 12/0246 | 711/103 |
| 9,246,886 B2* | 1/2016 | Hueber | G06F 21/72 | |
| 9,256,551 B2* | 2/2016 | Paaske | G09C 1/00 | |
| 9,342,521 B2* | 5/2016 | Isobe | G06F 16/10 | |
| 9,355,045 B2* | 5/2016 | Kambayashi | G06F 21/79 | |
| 9,477,636 B2 | 10/2016 | Walker et al. | | |
| 9,575,903 B2* | 2/2017 | Glew | G06F 12/1408 | |
| 9,735,962 B1 | 8/2017 | Yang et al. | | |
| 9,864,704 B2* | 1/2018 | Lee | G06F 21/62 | |
| 9,954,681 B2* | 4/2018 | Case | G09C 1/00 | |
| 10,096,379 B2* | 10/2018 | Sugahara | G11C 29/38 | |
| 10,169,618 B2* | 1/2019 | Van Antwerpen | G09C 1/00 | |
| 10,248,791 B2* | 4/2019 | Pappachan | G06F 21/602 | |
| 10,503,641 B2* | 12/2019 | Boyer | G06F 12/0822 | |
| 10,558,589 B1* | 2/2020 | de Cesare | G06F 21/602 | |
| 2001/0018736 A1* | 8/2001 | Hashimoto | G06F 21/123 | 713/1 |
| 2002/0073324 A1* | 6/2002 | Hsu | G06F 21/72 | 713/189 |
| 2003/0033537 A1* | 2/2003 | Fujimoto | G06F 21/123 | 713/193 |
| 2003/0046563 A1* | 3/2003 | Ma | G06F 21/72 | 713/190 |
| 2003/0118189 A1* | 6/2003 | Ibi | H04L 9/0891 | 380/277 |
| 2003/0198344 A1* | 10/2003 | Courcambeck | G06F 21/72 | 380/37 |
| 2004/0228493 A1* | 11/2004 | Ma | G06F 21/64 | 380/286 |
| 2004/0247128 A1* | 12/2004 | Patariu | H04L 9/0819 | 380/277 |
| 2004/0247129 A1* | 12/2004 | Patariu | G06F 21/602 | 380/277 |
| 2004/0250097 A1* | 12/2004 | Cheung | G06F 21/85 | 713/193 |
| 2005/0100163 A1* | 5/2005 | Buer | G06F 21/51 | 380/259 |
| 2005/0114664 A1* | 5/2005 | Davin | H04L 9/0869 | 713/170 |
| 2006/0090084 A1* | 4/2006 | Buer | G06F 21/575 | 713/189 |
| 2006/0129845 A1* | 6/2006 | Nakashima | G06F 21/79 | 713/191 |
| 2006/0149972 A1* | 7/2006 | Deng | G06F 21/6227 | 713/193 |
| 2006/0174137 A1* | 8/2006 | Carr | G06F 21/79 | 713/189 |
| 2007/0074046 A1* | 3/2007 | Czajkowski | G06F 21/14 | 713/190 |
| 2007/0172066 A1* | 7/2007 | Davin | H04L 9/0869 | 380/262 |
| 2007/0245141 A1* | 10/2007 | O'Keeffe | G06F 21/72 | 713/164 |
| 2008/0155275 A1* | 6/2008 | Natarajan | G06F 12/1408 | 713/193 |
| 2008/0205651 A1* | 8/2008 | Goto | H04L 9/3249 | 380/277 |
| 2008/0301164 A1* | 12/2008 | Isobe | G06F 16/10 | |
| 2008/0301467 A1* | 12/2008 | Saito | G06F 21/79 | 713/190 |
| 2009/0161866 A1* | 6/2009 | Riedl | H04L 9/0891 | 380/44 |
| 2009/0172415 A1* | 7/2009 | Takeda | G06F 12/1408 | 713/190 |
| 2009/0187771 A1* | 7/2009 | McLellan, Jr. | H04L 9/0891 | 713/193 |
| 2009/0204824 A1* | 8/2009 | Lin | G11B 20/0021 | 713/193 |
| 2011/0072276 A1 | 3/2011 | Lee et al. | | |
| 2011/0225131 A1* | 9/2011 | Isobe | G06F 16/10 | 707/693 |
| 2011/0246791 A1* | 10/2011 | Kambayashi | G06F 12/1408 | 713/193 |
| 2012/0222101 A1* | 8/2012 | Iwasaki | G06F 21/30 | 726/7 |
| 2013/0276149 A1* | 10/2013 | Gremaud | G06F 21/64 | 726/30 |
| 2014/0215126 A1* | 7/2014 | Avila | G06F 3/0688 | 711/103 |
| 2014/0223197 A1* | 8/2014 | Gueron | G06F 21/72 | 713/193 |
| 2014/0337642 A1* | 11/2014 | Takahashi | G06F 21/78 | 713/194 |
| 2015/0039905 A1* | 2/2015 | Griswold | G06F 21/602 | 713/190 |
| 2015/0046702 A1* | 2/2015 | Paaske | G06F 21/85 | 713/160 |
| 2015/0113152 A1* | 4/2015 | Sreeramoju | H04L 63/1458 | 709/228 |
| 2015/0155876 A1* | 6/2015 | Jayasena | G06F 15/7867 | 326/39 |
| 2015/0186295 A1* | 7/2015 | Savagaonkar | G06F 21/74 | 713/193 |
| 2015/0235053 A1* | 8/2015 | Lee | G06F 3/0619 | 713/193 |
| 2015/0248357 A1* | 9/2015 | Kaplan | G06F 9/45558 | 713/193 |
| 2015/0248668 A1* | 9/2015 | Radu | G06K 19/06206 | 705/71 |
| 2015/0286529 A1 | 10/2015 | Lunde | | |
| 2015/0371063 A1* | 12/2015 | Van Antwerpen | G09C 1/00 | 713/190 |
| 2016/0098200 A1* | 4/2016 | Guz | G06F 7/00 | 711/154 |
| 2016/0118142 A1* | 4/2016 | Sugahara | G11C 29/18 | 714/719 |
| 2016/0246737 A1* | 8/2016 | Vichodes | G06F 12/1408 | |
| 2017/0024570 A1 | 1/2017 | Pappachan | G06F 13/28 | |
| 2017/0060460 A1* | 3/2017 | Sugahara | G06F 3/0658 | |
| 2017/0115884 A1* | 4/2017 | Bhalerao | G06F 3/064 | |
| 2017/0161071 A1* | 6/2017 | Pierson | G06F 9/3016 | |
| 2017/0180122 A1* | 6/2017 | Smith | H04L 9/0833 | |
| 2017/0201503 A1* | 7/2017 | Jayasena | G06F 21/71 | |

(56) References Cited

U.S. PATENT DOCUMENTS

| | | |
|---|---|---|
| 2017/0263306 A1 | 9/2017 | Murphy |
| 2018/0074975 A1* | 3/2018 | Deutsch .............. G06F 12/1408 |
| 2018/0101685 A1* | 4/2018 | Amidi ................... G06F 21/602 |
| 2018/0137062 A1* | 5/2018 | Awad ................... G06F 12/0802 |
| 2018/0137294 A1* | 5/2018 | Van Antwerpen .......................... G06F 13/1605 |
| 2019/0006023 A1* | 1/2019 | Sugahara ............... G11C 29/38 |
| 2019/0095269 A1* | 3/2019 | Howe .............. H01L 27/10811 |
| 2019/0097788 A1* | 3/2019 | Howe ................... H04L 9/0637 |
| 2019/0122007 A1* | 4/2019 | Van Antwerpen ...... G06F 3/061 |
| 2019/0156038 A1* | 5/2019 | Pappachan .............. G06F 21/57 |
| 2019/0278911 A1* | 9/2019 | Pappachan .............. G06F 13/28 |
| 2019/0313254 A1* | 10/2019 | Zaks .................... H04W 76/27 |

OTHER PUBLICATIONS

Office Action dated Mar. 12, 2019 from the Singapore Patent Office for corresponding Singapore Patent Application No. 10201809248S.

Kaplan et al., "AMD Memory Encryption", White Paper, Advanced Micro Devices, Inc., Apr. 21, 2016.

Office Action dated Sep. 30, 2020 from the Indian Patent Office for Corresponding Indian Patent No. 201844035005.

* cited by examiner

FIG. 14

| REG_A | KY_A | S |
| --- | --- | --- |
| REG_B | KY_B | S |
| REG_C | EMPTY | N |
| ⋮ | ⋮ | ⋮ |

SEMICONDUCTOR MEMORY DEVICE AND MEMORY MODULE INCLUDING THE SAME

CROSS-REFERENCE TO RELATED APPLICATION

This U.S. Non-provisional application claims priority under 35 USC § 119 to Korean Patent Application No. 10-2017-0176887, filed on Dec. 21, 2017, in the Korean Intellectual Property Office (KIPO), the disclosure of which is incorporated by reference in its entirety herein.

BACKGROUND

1. Technical Field

Example embodiments relate generally to semiconductor integrated circuits, and more particularly to a semiconductor memory device, a memory system and a memory module.

2. Discussion of the Related Art

In a system of processing or storing data, information security is a very important issue. For example, an on-chip memory may be adopted to protect important information or data against external attacks. Probability of exposure of the important data may be reduced by storing the data in the on-chip memory formed in a host processor. However, size and cost may be increased to implement a processor including an on-chip memory. As alternative solution, important data may be encrypted and the encrypted data may be stored in a memory external to the host device. The external memory may not grasp contents of the encrypted data and thus efficiency of processing the encrypted data stored in the external memory may be degraded.

SUMMARY

Some example embodiments may provide a semiconductor memory device capable of enhancing data processing efficiency without degradation of data security.

Some example embodiments may provide a memory system and a memory module including a semiconductor memory device capable of enhancing data processing efficiency without degradation of data security.

According to example embodiments, a semiconductor memory device includes a memory core including a plurality of memory cells, an on-chip processor configured to perform on-chip data processing and a memory security controller configured to decrypt encrypted data provided from the memory core or from a memory controller and to provide the decrypted data to the on-chip processor and configured to encrypt result data from the on-chip processor to provide result-encrypted data to the memory core or the memory controller.

According to example embodiments, a semiconductor memory device includes a buffer semiconductor die, a plurality of memory semiconductor dies stacked with the buffer semiconductor die, through-silicon vias electrically connecting the buffer semiconductor die and the plurality of memory semiconductor dies, an on-chip processor on one of the memory semiconductor dies, configured to perform on-chip data processing with respect to input data in order to provide result data and a security controller configured to decrypt encrypted data to provide decrypted data as the input data to the on-chip processor and encrypt the result data from the on-chip processor to provide re-encrypted data.

A method of performing secure operations for a semiconductor memory device having at least a first memory chip having a memory core including a plurality of memory cells, the method comprising: decrypting, at the first memory chip, encrypted data provided from the memory core or from a memory controller; performing an on-chip processing operation by an on-chip processor of the first memory chip, by receiving the decrypted data, and outputting a result data; encrypting, at the first memory chip, the result data from the on-chip processor to provide result-encrypted data to the memory core or the memory controller.

The semiconductor memory device, the memory system and the method according to example embodiments may enhance data processing efficiency without degradation of data security by decrypting the encrypted data in the semiconductor memory device to perform on-chip processing operations.

BRIEF DESCRIPTION OF THE DRAWINGS

Example embodiments of the present disclosure will be more clearly understood from the following detailed description taken in conjunction with the accompanying drawings.

FIG. 14 is a diagram illustrating a key register according to example embodiments.

DETAILED DESCRIPTION OF THE EMBODIMENTS

Figure 1:
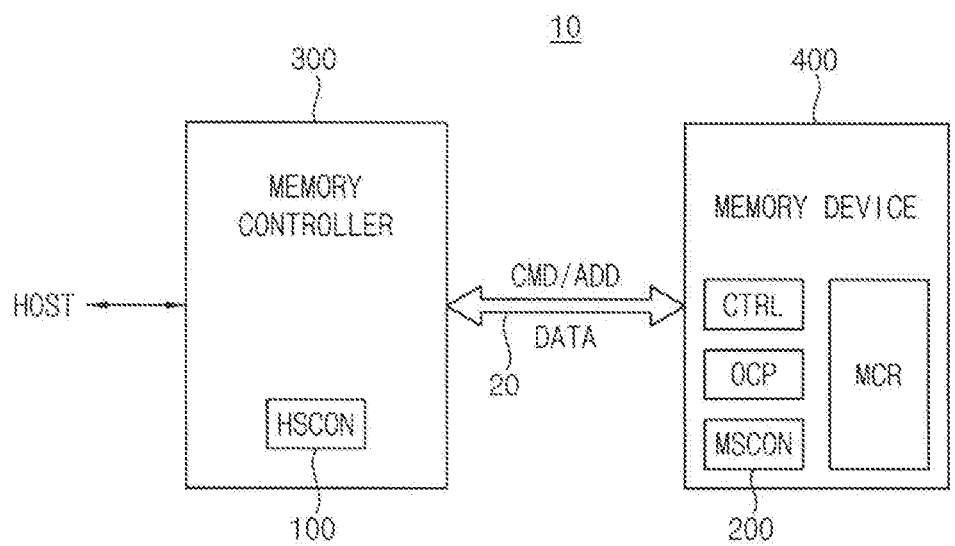
FIG. 1 is a block diagram illustrating a memory system according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a block diagram illustrating a memory system according to example embodiments.

Referring to FIG. 1, a memory system 10 includes a memory controller 300 and a semiconductor memory device 400.

The memory controller 300 may control overall operations of the semiconductor memory device 400 through a channel 20 or an interconnect device. The memory controller 300 may control an overall data exchange between an external host device and the semiconductor memory device 400. For example, the memory controller 300 may write data in the semiconductor memory device 400 or read data from the semiconductor memory device 400 in response to a request from the host device. The memory controller 300 may issue an operation command CMD and an address ADD to the semiconductor memory device 400 for controlling the semiconductor memory device 400. The channel 20 may include a data bus for transferring data and a control bus for transferring the command CMD and the address ADD.

The memory controller 300 may include a host security controller HSCON 100. The host security controller 100 may encrypt write data to be stored in the semiconductor memory device 400 to generate encrypted data and decrypt the encrypted data read from the semiconductor memory device 400.

The semiconductor memory device 400 may include a memory core MCR, a control circuit CTRL, an on-chip processor OCP and a memory security controller MSCON 200. As described herein, a "semiconductor memory device" refers to a semiconductor chip (e.g., integrated circuit formed on a die) or a semiconductor package including one or more semiconductor chips stacked on a package substrate. The term "on-chip processor" described herein refers to a processor included in a semiconductor chip or semiconductor package for performing processing operations on data stored in or written to the semiconductor chip or semiconductor package. An electronic device as described herein may refer to such a semiconductor memory device, or to a device that includes such a semiconductor memory device, such as a memory module or computer system. The memory core MCR may include a plurality of memory cells for storing data. The memory security controller 200 may decrypt the encrypted data provided from the memory controller 300 or the memory core MCR to generate and provide decrypted data to the on-chip processor OCP. The on-chip processor OCP may perform a processing-in-memory (PIM) with respect to the decrypted data to generate and provide result data of the PIM. For example, processing-in-memory refers to performing one or more operations on data, rather than simply storing or buffering the data, and may result in transformed data or resulting data. Processing-in-memory may be referred to as on-chip data processing. The memory security controller 200 may encrypt again the result data from the on-chip processor OCP to generate and provide re-encrypted data to the memory controller 300 or the memory core MCR. The memory security controller 200 may perform the encryption and decryption identical to the encryption and decryption performed by the host security controller 100.

Figure 2:
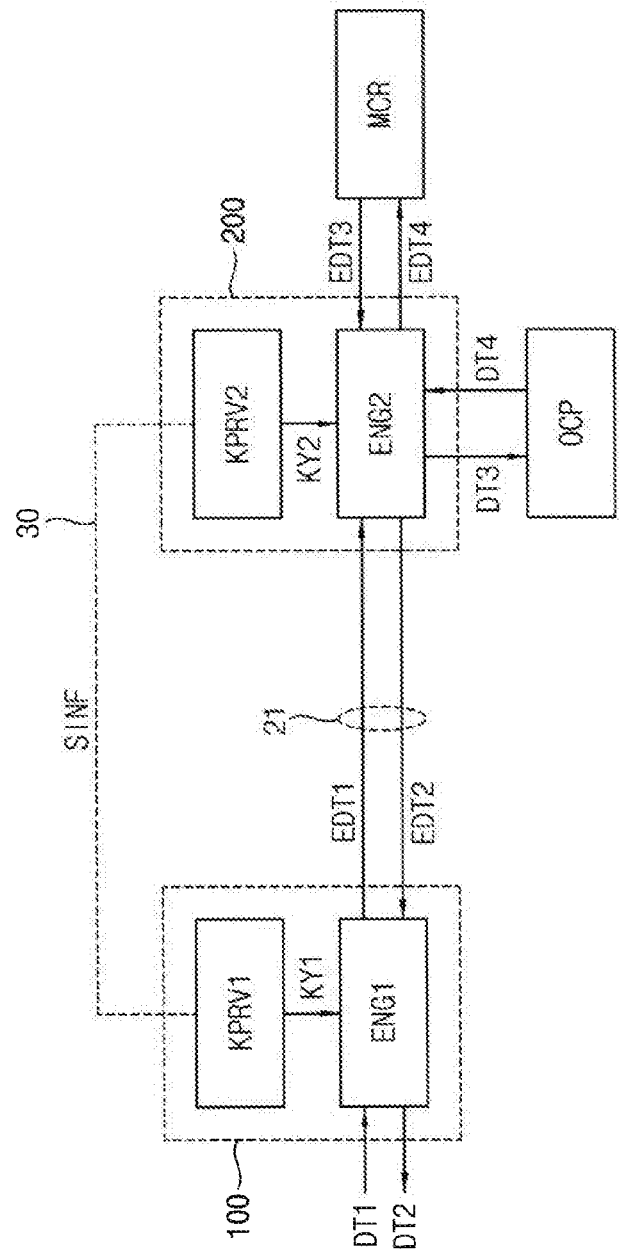
FIG. 2 is a diagram illustrating a data flow in a memory system according to example embodiments.

FIG. 2 is a diagram illustrating a data flow in a memory system according to example embodiments.

FIG. 2 illustrates a host security controller 100 included in the memory controller 300, and a memory security controller 200, an on-chip processor OCP and a memory core MCR included in the semiconductor memory device 400.

The host security controller 100 may include a first key provider KPRV1 and a first security engine ENG1. The first key provider KPRV1 may provide a first security key KY1 and the first security engine ENG1 may perform encryption and decryption with respect to first data DT1 based on the first security key KY1 to generate first encrypted data EDT1. The first encrypted data EDT1 may be transferred to the semiconductor memory device 400 as write data. In addition, the first security engine ENG1 may decrypt second encrypted data EDT2 transferred from the semiconductor memory device 400 based on the first security key KY1 to generate second data DT2. The first data DT1 and the second data DT2 are non-encrypted data or decrypted data.

The memory security controller 200 may include a second key provider KPRV2 and a second security engine ENG2. The second key provider KPRV2 may provide a second security key KY2 identical to the first security key KY1 and the second security engine ENG2 may decrypt the first encrypted data EDT1 provided from the host security controller 100 or third encrypted data EDT3 provided from the memory core MCR, based on the second security key KY2, to generate third data DT3. In addition, the memory security controller 200 may encrypt fourth data DT4 corresponding to the result data of the on-chip processor OCP based on the second security key KY2 to provide the second encrypted data EDT2 to the memory controller 300 or fourth encrypted data EDT4 to the memory core MCR. The third data DT3 and the fourth data DT4 are non-encrypted data or decrypted data.

The first encrypted data EDT1 corresponding to write data and the second encrypted data EDT2 corresponding to read data may be transferred through a data bus 21. The data bus 21 may be included in the channel 20 in FIG. 1.

For identification of the first security key KY1 and the second security key KY2, security information SINF may be transferred between the memory controller 300 and the semiconductor memory device 400. In some example embodiments, as illustrated in FIG. 2, the security information SINF may be transferred through a side-band channel 30 directly connecting the first key provider KPRV1 and the second key provider KPRV2. In other example embodiments, the security information SINF may be transferred through the channel 20 in FIG. 1. According to example embodiments, the security information SINF may be transferred from the memory controller 300 to the semiconductor memory device 400, or from the semiconductor memory device 400 to the memory controller 300. The security information SINF may be transferred during a booting process, a power-on process, or a normal operation of the memory system 10. As will be described below, the security information SINF may include a security key, a seed value, and other parameters.

The first security engine ENG1 and the second security engine ENG2 may perform the same encryption and decryption based on the same security key. Each of the first security engine ENG1 and the second security engine ENG2 may be implemented as hardware, software, or a combination of hardware and software, for example, that performs encryption and decryption based on the advanced encryption standard (AES).

As such, the semiconductor memory device 400 and the memory system 10 according to example embodiments may enhance data processing efficiency without degradation of data security by decrypting the encrypted data in the semiconductor memory device 400 to perform the PIM.

Figure 3:
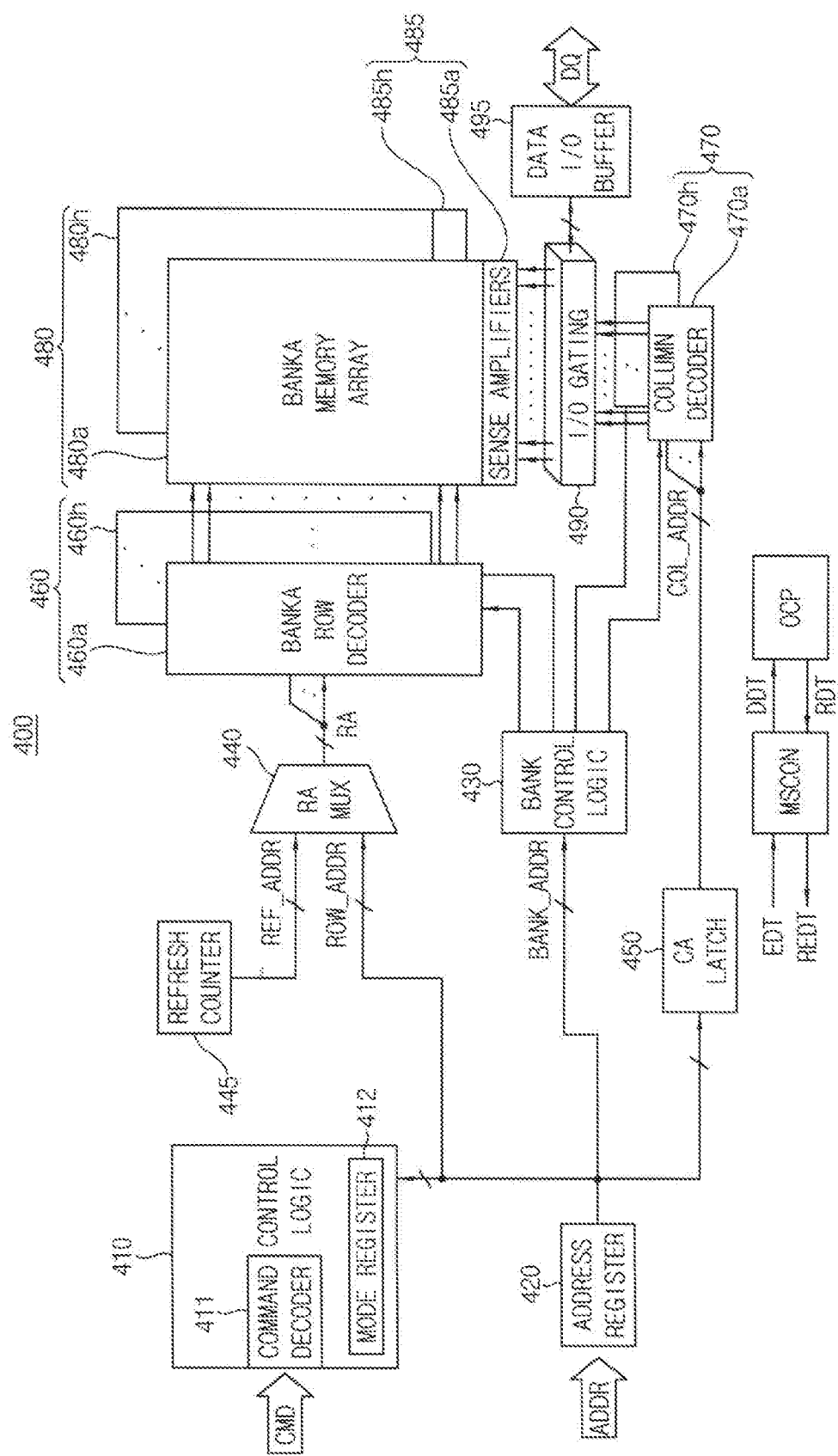
FIG. 3 is a block diagram illustrating a semiconductor memory device according to example embodiments.

FIG. 3 is a block diagram illustrating a semiconductor memory device according to example embodiments.

Although a dynamic random access memory (DRAM) is described as an example of the semiconductor memory device, the semiconductor memory device may be any of a variety of memory cell architectures, including, but not limited to, volatile memory architectures such as DRAM, thyristor RAM (TRAM) and static RAM (SRAM), or non-volatile memory architectures, such as read only memory (ROM), flash memory, phase change RAM (PRAM), ferroelectric RAM (FRAM), magnetic RAM (MRAM), and the like.

Referring to FIG. 3, a memory integrated circuit 400 includes a control logic 410, an address register 420, a bank control logic 430, a row address multiplexer 440, a refresh counter 445, a column address latch 450, a row decoder 460, a column decoder 470, a memory cell array 480, a sense amplifier unit 485, an input/output (I/O) gating circuit 490, a data input/output (I/O) buffer 495, an on-chip processor OCP and a memory security controller MSCON.

The memory cell array 480 may include a plurality of bank arrays 480a~480h. The row decoder 460 may include a plurality of bank row decoders 460a~460h respectively coupled to the bank arrays 480a~480h, the column decoder 470 may include a plurality of bank column decoders 470a~470h respectively coupled to the bank arrays 480a~480h, and the sense amplifier unit 485 may include a plurality of bank sense amplifiers 485a~485h respectively coupled to the bank arrays 480a~480h.

The address register 420 may receive an address ADDR including a bank address BANK_ADDR, a row address ROW_ADDR and a column address COL_ADDR from the memory controller. The address register 420 may provide the received bank address BANK_ADDR to the bank control logic 430, may provide the received row address ROW_ADDR to the row address multiplexer 440, and may provide the received column address COL_ADDR to the column address latch 450.

The bank control logic 430 may generate bank control signals in response to the bank address BANK_ADDR. One of the bank row decoders 460a~460h corresponding to the bank address BANK_ADDR may be activated in response to the bank control signals, and one of the bank column decoders 470a~470h corresponding to the bank address BANK_ADDR may be activated in response to the bank control signals.

The row address multiplexer 440 may receive the row address ROW_ADDR from the address register 420, and may receive a refresh row address REF_ADDR from the refresh counter 445. The row address multiplexer 440 may selectively output the row address ROW_ADDR or the refresh row address REF_ADDR as a row address RA. The row address RA that is output from the row address multiplexer 440 may be applied to the bank row decoders 460a~460h.

The activated one of the bank row decoders 460a~460h may decode the row address RA that is output from the row address multiplexer 440, and may activate a word-line corresponding to the row address RA. For example, the activated bank row decoder may apply a word-line driving voltage to the word-line corresponding to the row address RA.

The column address latch 450 may receive the column address COL_ADDR from the address register 420, and may temporarily store the received column address COL_ADDR. In some embodiments, in a burst mode, the column address latch 450 may generate column addresses that increment from the received column address COL_ADDR. The column address latch 450 may apply the temporarily stored or generated column address to the bank column decoders 470a~470h.

The activated one of the bank column decoders 470a~470h may decode the column address COL_ADDR that is output from the column address latch 450, and may control the input/output gating circuit 490 to output data corresponding to the column address COL_ADDR.

The I/O gating circuit 490 may include a circuitry for gating input/output data. The I/O gating circuit 490 may further include read data latches for storing data that is output from the bank arrays 480a~480h, and write drivers for writing data to the bank arrays 480a~480h.

Data to be read from one bank array of the bank arrays 480a~480h may be sensed by a sense amplifier 485 coupled to the one bank array from which the data is to be read, and may be stored in the read data latches. The data stored in the read data latches may be provided to the memory controller via the data I/O buffer 495. Data DQ to be written in one bank array of the bank arrays 480a~480h may be provided to the data I/O buffer 495 from the memory controller. The write driver may write the data DQ in one bank array of the bank arrays 480a~480h.

The control logic 410 may control operations of the memory integrated circuit 400. For example, the control logic 410 may generate control signals for the memory integrated circuit 400 to perform a write operation or a read operation. The control logic 410 may include a command decoder 411 that decodes a command CMD received from the memory controller and a mode register set 412 that sets an operation mode of the semiconductor memory device 400. For example, the command decoder 411 may generate the control signals corresponding to the command CMD by decoding a write enable signal, a row address strobe signal, a column address strobe signal, a chip selection signal, etc.

The memory security controller MSCON may decrypt encrypted data EDT provided from the memory controller 300 or the memory core MCR (e.g., bank arrays) to generate and provide decrypted data DDT to the on-chip processor OCP. The on-chip processor OCP may perform a processing-in-memory (PIM) with respect to the decrypted data DDT to generate and provide result data RDT of the PIM. The memory security controller MSCON may encrypt again the result data RDT from the on-chip processor OCP to generate and provide result-encrypted data REDT to the memory controller 300 or the memory core MCR. In some embodiments, the result-encrypted data REDT may be encrypted using the same key as used when encrypting data to form the encrypted data EDT, and therefore the result-encrypted data REDT in this case can be referred to as re-encrypted data.

Figure 4:
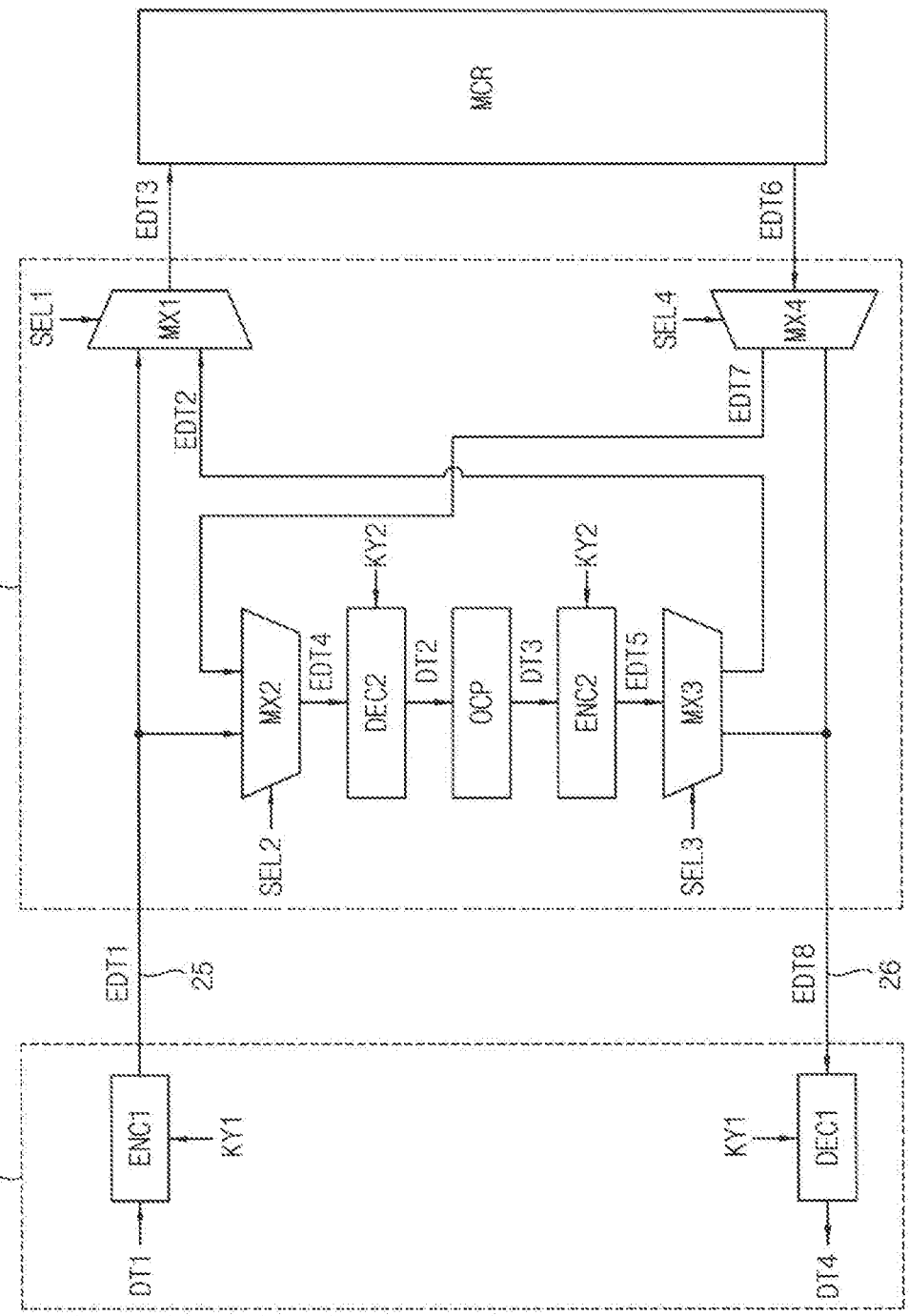
FIG. 4 is a diagram illustrating an example configuration of security engines included in the security controllers of FIG. 2.

FIG. 4 is a diagram illustrating an example configuration of security engines included in the security controllers of FIG. 2. Also an on-chip processor OCP and a memory core MCR are illustrated in FIG. 4.

Referring to FIG. 4, a first security engine 101 of the host security controller 100 may include a first encryptor ENC1 and a first decryptor EDC1, and a second security engine 201 of the memory security controller 200 may include a second encryptor ENC2, a second decryptor DEC2, a first selector MX1, a second selector MX2, a third selector MX3 and a fourth selector MX4. The encryptors and decryptors described herein may be encryption or decryption circuits including circuitry configured to encrypt or decrypt data, and the selectors may each be a selection circuit including circuitry configured to select between two or more inputs or outputs.

The first encryptor ENC1 encrypts first data DT1 based on a first security key KY1 to generate first encrypted data EDT1 and provides the first encrypted data EDT1 to a semiconductor memory device through a first data path 25. The first selector MX1 selects one of the first encrypted data EDT1 and second encrypted data EDT2 in response to a first selection signal SEL1 to provide third encrypted data EDT3 to the memory core MCR. The second selector MX2 selects one of the first encrypted data EDT1 and seventh encrypted data EDT7 in response to a second selection signal SEL2 to provide fourth encrypted data EDT4. The second decryptor DEC2 decrypts the fourth encrypted data EDT4 based on the second security key KY2 to generate second data DT2 corresponding to decrypted data. The on-chip processor OCP performs a PIM with respect to the second data DT2 to generate third data DT3 corresponding to result data. The second encryptor ENC2 encrypts the third data DT3 again based on the second security key KY2 to generate fifth encrypted data EDT5 corresponding to result-encrypted data. The third selector MX3 provides the fifth encrypted data EDT5, in response to a third selection signal SEL3, as the second encrypted data EDT2 to the first selector MX1 or as eighth data EDT8 to a memory controller through a second path 26. The fourth selector MX4 provides sixth encrypted data EDT6 from the memory core MCR, in response to a fourth selection signal SEL4, as the seventh encrypted data EDT7 to the second selector MX2 or as the eighth data EDT8 to the memory controller through the second path 26. The first decryptor DEC1 decrypts the eighth data EDT8 based on the first security key KY1 to generate fourth data DT4.

The first through fourth selection signal SEL1~SEL4 may be generated by the control logic 410 in FIG. 3, for example, based on the command from the memory controller. If a bidirectional data bus connects the memory controller and the semiconductor memory device, the first data bus 25 and the second data bus 26 may be the same bus.

As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts. Certain blocks are referred to herein as engines.

Hereinafter, example operations of a memory system adopting the configuration of FIG. 4 will be described below with reference to FIGS. 5 through 9.

Figure 5:
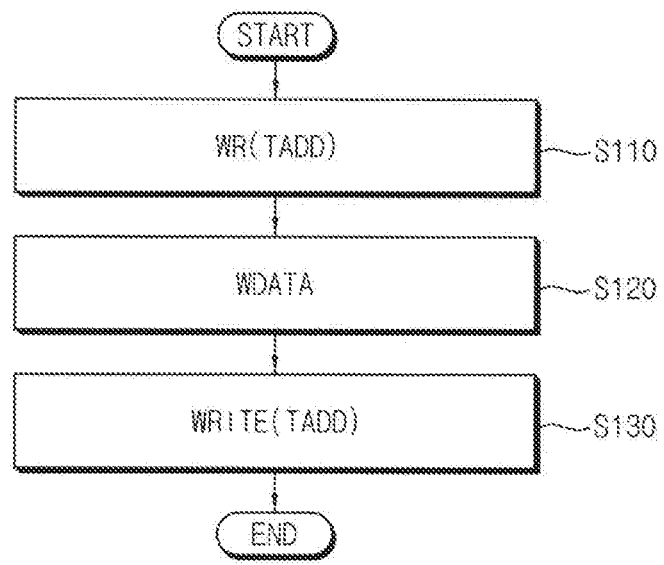
FIGS. 5 through 9 are flow charts illustrating operations of a semiconductor memory device according to example embodiments.

FIG. 5 is a flow chart illustrating a normal write operation of a semiconductor memory device according to example embodiments.

Referring to FIGS. 4 and 5, the memory controller transfers a normal write command WR with a target address TADD corresponding to a write address to the semiconductor memory device (S110). In addition, the memory controller transfers first encrypted data EDT1 corresponding to write data WDATA to the semiconductor memory device (S120). The first selector MX1 selects the first encrypted data EDT1 in response to the first selection signal SEL1 and outputs the first encrypted data EDT1 as the third encrypted data EDT3. The semiconductor memory device writes the third encrypted data EDT3 to the target address TADD of the memory core MCR (S130).

Figure 6:
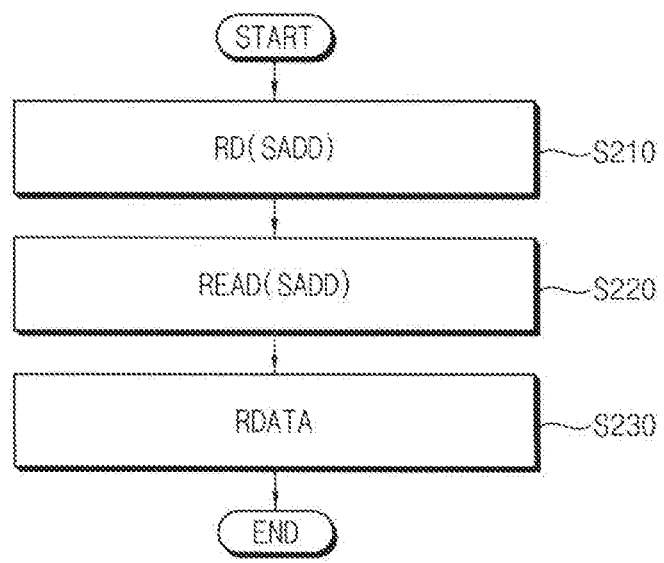

FIG. 6 is a flow chart illustrating a normal read operation of a semiconductor memory device according to example embodiments.

Referring to FIGS. 4 and 6, the memory controller transfers a normal read command RD with a source address SADD corresponding to a read address to the semiconductor memory device (S210). The semiconductor memory device reads out the sixth encrypted data EDT6 from the source address SADD of the memory core MCR (S220). The fourth selector MX4, in response to the fourth selection signal SEL4, provides the sixth encrypted data EDT6 as the eighth encrypted data EDT8 corresponding to read data RDATA to the memory controller through the second data path 26 (S230).

Figure 7:
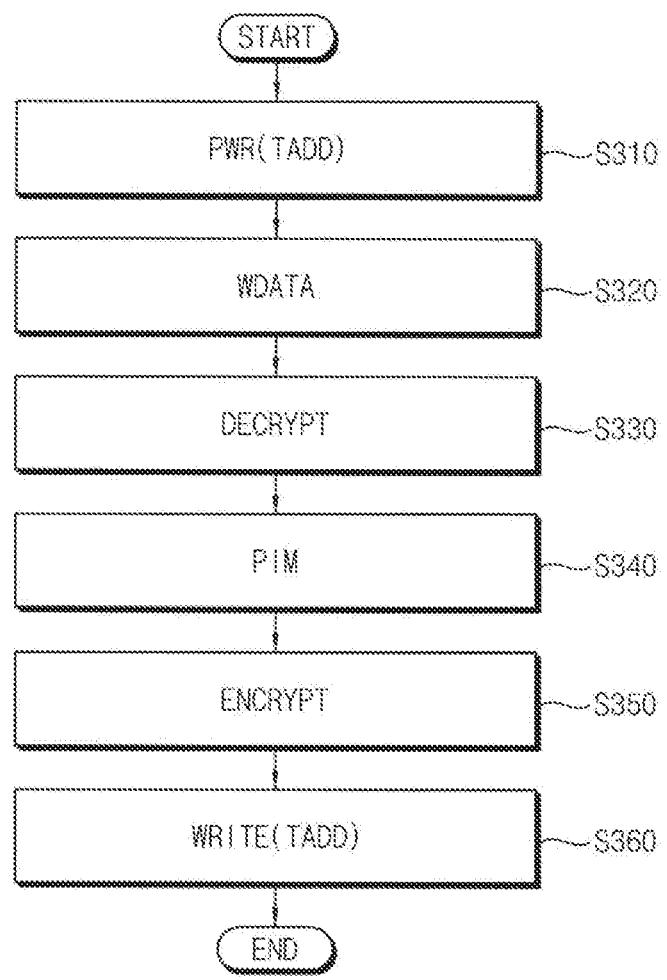

FIG. 7 is a flow chart illustrating a processing and write operation of a semiconductor memory device according to example embodiments.

Referring to FIGS. 4 and 7, the memory controller transfers a processing and write command PWR with a target address TADD corresponding to a write address to the semiconductor memory device (S310). In addition, the memory controller transfers first encrypted data EDT1 corresponding to write data WDATA to the semiconductor memory device (S320). The second selector MX2 selects the first encrypted data EDT1 and outputs the first encrypted data EDT1 as the fourth encrypted data EDT4. The second decryptor DEC2 decrypts the fourth encrypted data EDT4 based on the second security key KY2 to generate the second data DT2 (S330). The on-chip processor OCP performs the PIM of the second data DT2 to generate the third data DT3 (S340). The second encryptor ENC2 encrypts the third data DT3 based on the second security key KY2 to generate the fifth encrypted data EDT5 (350). The third selector MX3 provides the fifth encrypted data EDT5 as the second encrypted data EDT2 to the first selector MX1 in response to the third selection signal SEL3. The first selector MX1 selects the second encrypted data EDT2 in response to the first selection signal SEL1 and outputs the second encrypted data EDT2 as the third encrypted data EDT3. The semiconductor memory device writes the third encrypted data EDT3 to the target address TADD of the memory core MCR (S360).

Figure 8:
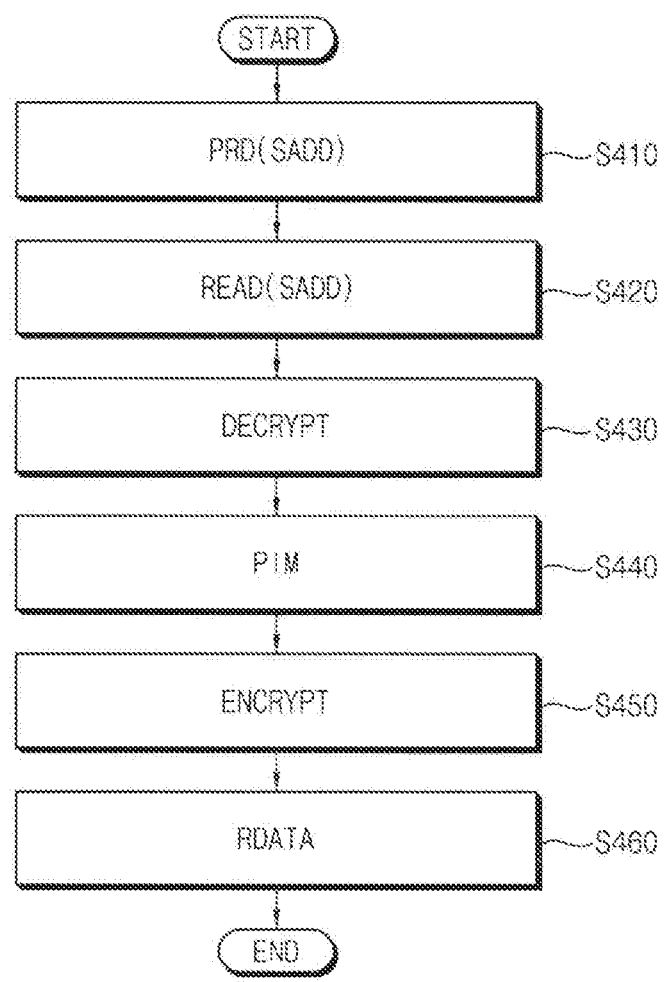

FIG. 8 is a flow chart illustrating a processing and read operation of a semiconductor memory device according to example embodiments.

Referring to FIGS. 4 and 8, the memory controller transfers a processing and read command PRD with a source address SADD corresponding to a read address to the semiconductor memory device (S410). The semiconductor memory device reads out the sixth encrypted data EDT6 from the source address SADD of the memory core MCR (S420). The fourth selector MX4, in response to the fourth selection signal SEL4, provides the sixth encrypted data EDT6 as the seventh encrypted data EDT7 to the second selector MX2. The second selector MX2 selects and outputs the seventh encrypted data EDT7 as the fourth encrypted data EDT4 in response to the second selection signal SEL2. The second decryptor DEC2 decrypts the fourth encrypted data EDT4 based on the second security key KY2 to generate the second data DT2 (S430). The on-chip processor OCP performs the PIM of the second data DT2 to generate the third data DT3 (S440). The second encryptor ENC2 encrypts the third data DT3 based on the second key KY2 to generate the fifth encrypted data EDT5 (S450). The third selector MX3, in response to the third selection signal SEL3, provides the fifth encrypted data EDT5 as the eighth encrypted data EDT8 corresponding to read data RDATA to the memory controller through the second data path 26 (S460).

Figure 9:
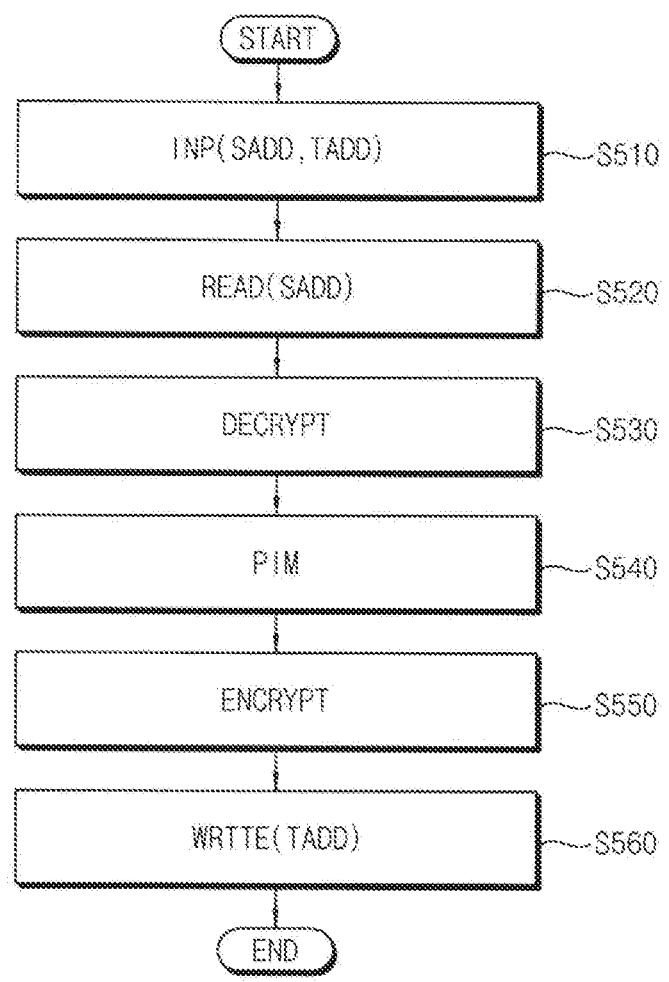

FIG. 9 is a flow chart illustrating an internal processing operation of a semiconductor memory device according to example embodiments.

Referring to FIGS. 4 and 9, the memory controller transfers an internal processing command INP with a source address SADD corresponding to a read address and a target address TADD corresponding to a write address to the semiconductor memory device (S510). The semiconductor memory device reads out the sixth encrypted data EDT6 from the source address SADD of the memory core MCR (S520). The fourth selector MX4, in response to the fourth selection signal SEL4, provides the sixth encrypted data EDT6 as the seventh encrypted data EDT7 to the second selector MX2. The second selector MX2 selects and outputs the seventh encrypted data EDT7 as the fourth encrypted data EDT4 in response to the second selection signal SEL2. The second decryptor DEC2 decrypts the fourth encrypted data EDT4 based on the second security key KY2 to generate the second data DT2 (S530). The on-chip processor OCP performs the PIM of the second data DT2 to generate the third data DT3 (S540). The second encryptor ENC2 encrypts the third data DT3 based on the second key KY2 to generate the fifth encrypted data EDT5 (S550). The first selector MX1 selects the second encrypted data EDT2 in response to the first selection signal SEL1 and outputs the second encrypted data EDT2 as the third encrypted data EDT3. The semiconductor memory device writes the third encrypted data EDT3 to the target address TADD of the memory core MCR (S560).

FIGS. 10 through 13 are diagrams for describing example embodiments of generating a security key in a memory system according to example embodiments.

Figure 10:
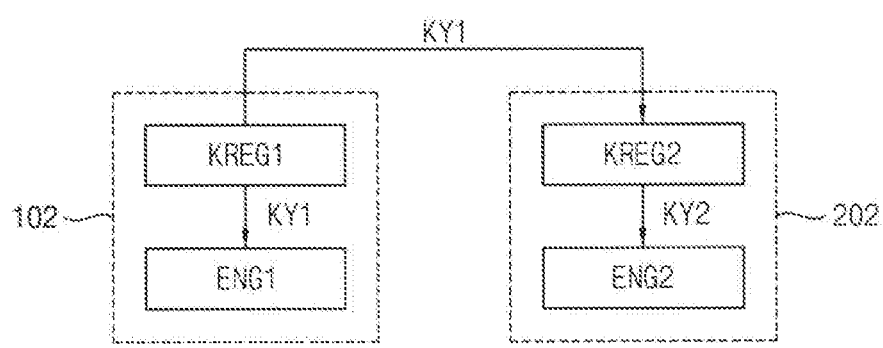
FIGS. 10 through 13 are diagrams for describing example embodiments of generating a security key in a memory system according to example embodiments.

Referring to FIG. 10, a host security controller 102 of the memory controller may include a first key register KREG1 and a first security engine ENG1, and a memory security controller 202 of the semiconductor memory device may include a second key register KREG2 and a second security engine ENG2.

The first key register KREG1 may store and provide a first security key KY1. The first security engine ENG1 may perform encryption and decryption with respect to input data based on the first security key KY1. The second key register KREG2 may receive the first security key KY1 from the memory controller to store and provide the first security key KY1 as a second key KY2. The second security engine ENG2 may perform encryption and decryption with respect to input data based on the second security key KY2.

Figure 11:
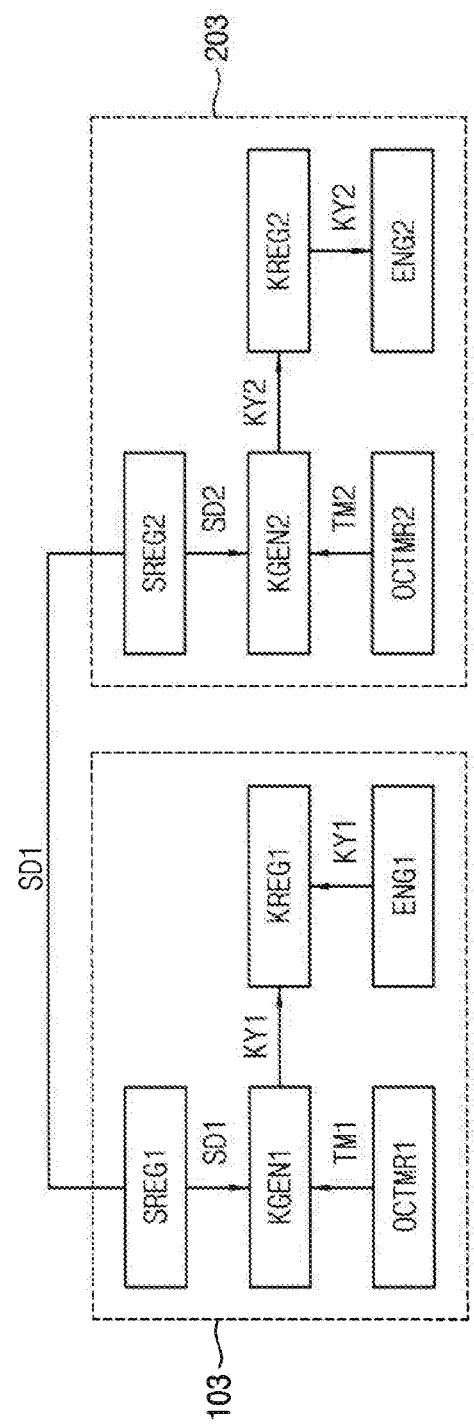

Referring to FIG. 11, a host security controller 103 of the memory controller may include a first seed register SREG1, a first on-chip timer OCTMR1, a first key generator KGEN1, a first key register KREG1 and a first security engine ENG1, and a memory security controller 203 of the semiconductor memory device may include a second seed register SREG2, a second on-chip timer OCTMR2, a second key generator KGEN2, a second key register KREG2 and a second security engine ENG2.

The first seed register SREG1 may store and provide a first seed value SD1, and the first on-chip timer OCTMR1 may provide a first time information TM1. The first key generator KGEN1 may generate a first security key KY1 based on the first seed value SD1 and the first time information TM1. The first key register KREG1 may store and provide the first security key KY1. The first security engine ENG1 may perform encryption and decryption with respect to input data based on the first security key KY1.

The second seed register SREG2 may receive the first seed value SD1 from the first seed register SREG1 to store and provide the first seed value SD1 as a second seed value SD2. The second on-chip timer OCTMR2 may provide a second time information TM2 and the second on-chip timer OCTMR2 may be synchronized with the first on-chip timer OCTMR1. The second key generator KGEN2 may generate a second security key KY2 based on the second seed value SD2 and the second time information TM2. The second key register KREG2 may store and provide the second key KY2. The second security engine ENG2 may perform encryption and decryption with respect to input data based on the second security key KY2.

In some example embodiments, each of the first key generator KGEN1 and the second key generator KGEN2 may include a random number generator configured to generate a random number for a security key based on a seed value and a time information.

As such, the memory controller may not transfer the security key directly to the semiconductor memory device. The security key may be generated in the semiconductor memory device using the seed value and the time information and thus the degree of security may be enhanced.

Figure 12:
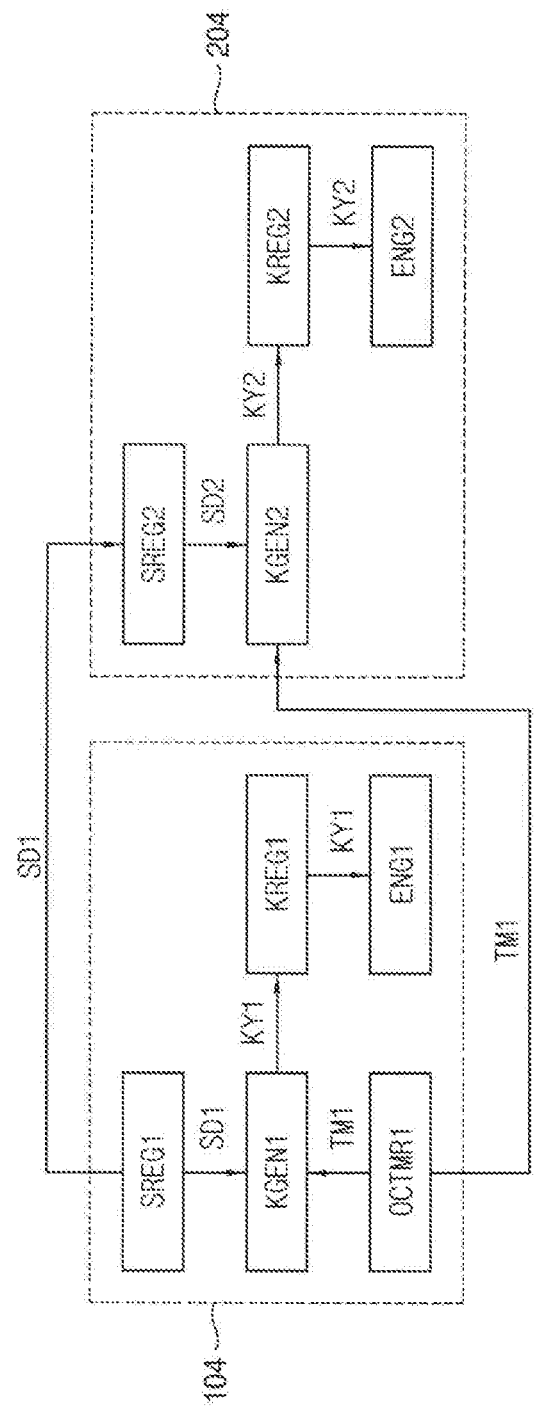

Referring to FIG. 12, a host security controller 104 of the memory controller may include a first seed register SREG1, a first on-chip timer OCTMR1, a first key generator KGEN1, a first key register KREG1 and a first security engine ENG1, and a memory security controller 203 of the semiconductor memory device may include a second seed register SREG2, a second key generator KGEN2, a second key register KREG2 and a second security engine ENG2.

The first seed register SREG1 may store and provide a first seed value SD1, and the first on-chip timer OCTMR1 may provide a first time information TM1. The first key generator KGEN1 may generate a first security key KY1 based on the first seed value SD1 and the first time information TM1. The first key register KREG1 may store and provide the first security key KY1. The first security engine ENG1 may perform encryption and decryption with respect to input data based on the first security key KY1.

The second seed register SREG2 may receive the first seed value SD1 from the first seed register SREG1 to store and provide the first seed value SD1 as a second seed value SD2. The second key generator KGEN2 may generate a second security key KY2 based on the second seed value SD2 and the first time information TM1 provided from the first on-chip timer OCTMR1. The second key register KREG2 may store and provide the second key KY2. The second security engine ENG2 may perform encryption and decryption with respect to input data based on the second security key KY2.

Figure 13:
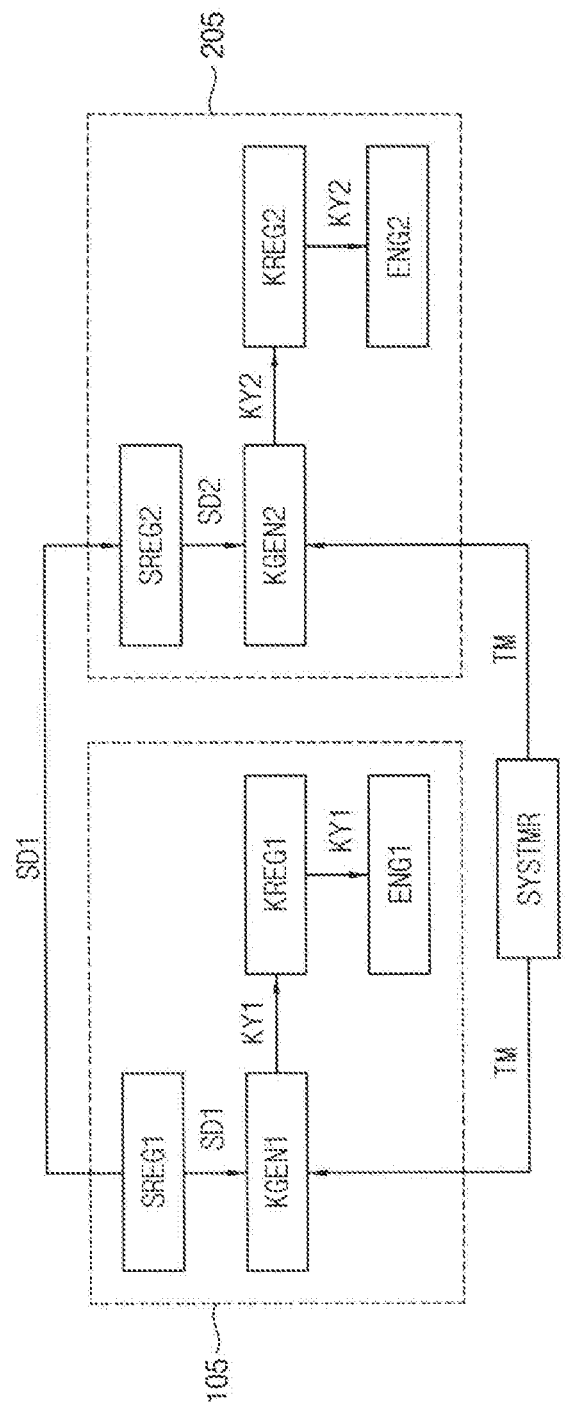

Referring to FIG. 13, a host security controller 105 of the memory controller may include a first seed register SREG1, a first key generator KGEN1, a first key register KREG1 and a first security engine ENG1, and a memory security controller 205 of the semiconductor memory device may include a second seed register SREG2, a second key generator KGEN2, a second key register KREG2 and a second security engine ENG2.

The first seed register SREG1 may store and provide a first seed value SD1. The first key generator KGEN1 may generate a first security key KY1 based on the first seed value SD1 and a time information TM provided from a system timer SYSTMR. The first key register KREG1 may store and provide the first security key KY1. The first security engine ENG1 may perform encryption and decryption with respect to input data based on the first security key KY1.

The second seed register SREG2 may receive the first seed value SD1 from the first seed register SREG1 to store and provide the first seed value SD1 as a second seed value SD2. The second key generator KGEN2 may generate a second security key KY2 based on the second seed value SD2 and the time information TM provided from the system timer SYSTMR. The second key register KREG2 may store and provide the second key KY2. The second security engine ENG2 may perform encryption and decryption with respect to input data based on the second security key KY2.

Figure 14:
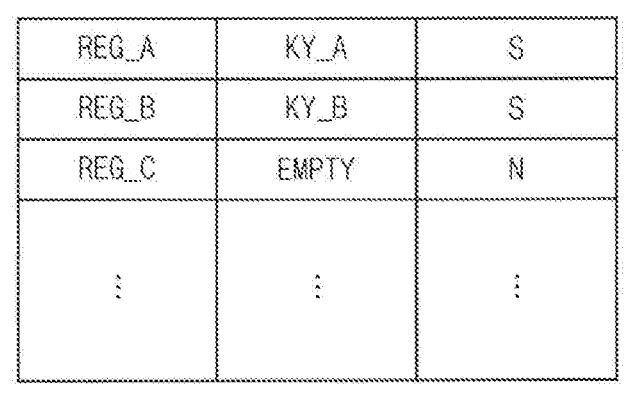

FIG. 14 is a diagram illustrating a key register according to example embodiments.

Referring to FIG. 14, a key register may include flag values S and N indicating whether security scenario is applied or not to each of memory regions REG_A, REG_B and REG_C. For example, a first flag value S may be assigned to the memory regions REG_A and REG_B in which encrypted data are stored according to the security scenario, and a second flag value N may be assigned to the memory region REG_C in which not-encrypted data are stored. Security keys KY_A and KY_B may be assigned to the memory regions REG_A and REG_B to which the security scenario is applied.

The memory regions REG_A, REG_B and REG_C may be divided based on the addresses of the semiconductor memory device. In this case, the control logic 410 in FIG. 3 may generate a control signal indicating the memory region corresponding to the address ADD from the memory controller. The key register as illustrated in FIG. 14 included in the semiconductor memory device may provide the corresponding security key based on the control signal. The control logic 410 may generate selection signals of FIG. 15 based on the command CMD and the address ADD from the memory controller.

Figure 15:
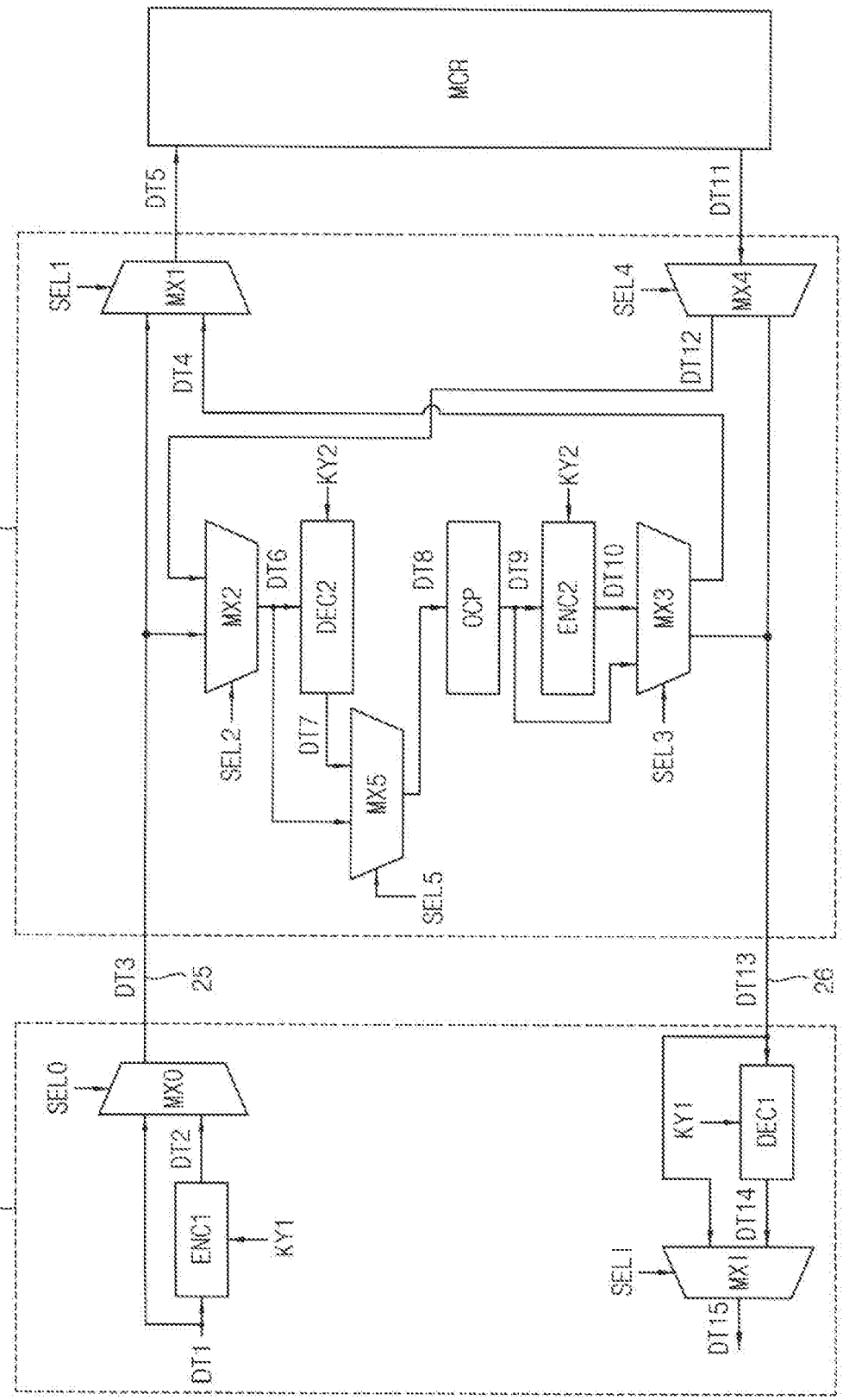
FIG. 15 is a diagram illustrating an example configuration of security engines included in the security controllers of FIG. 2.

FIG. 15 is a diagram illustrating an example configuration of security engines included in the security controllers of FIG. 2. Also an on-chip processor OCP and a memory core MCR are illustrated in FIG. 15.

Referring to FIG. 15, a first security engine 106 of the host security controller 100 may include a first encryptor ENC1, a first decryptor EDC1, an output selector MXO and an input selector MXI, and a second security engine 206 of the memory security controller 200 may include a second encryptor ENC2, a second decryptor DEC2, a first selector MX1, a second selector MX2, a third selector MX3, a fourth selector MX4 and a fifth selector MX5.

The first encryptor ENC1 encrypts first data DT1 based on a first security key KY1 to generate first encrypted data as second data DT2. The output selector MXO selects one of the first data DT1 and second data DT2 and provides the selected data as third data DT3 to a semiconductor memory device through a first data path 25. The first selector MX1 selects one of the third data DT3 and fourth data DT4 in response to a first selection signal SEL1 to provide fifth data DT5 to the memory core MCR. The second selector MX2 selects one of the third data DT3 and twelfth data DT12 in response to a second selection signal SEL2 to provide sixth data DT6, which may be encrypted data. The second decryptor DEC2 decrypts the sixth data DT6 based on the second security key KY2 to generate seventh data DT7 corresponding to decrypted data. The fifth selector MX5 selects one of the sixth data DT6 and the seventh data DT7 in response to a fifth selection signal SEL5 to output eighth data DT8. The on-chip processor OCP performs a PIM with respect to the eighth data DT8 to generate ninth data DT9 corresponding to result data. The second encryptor ENC2 encrypts the ninth data DT9 again based on the second security key KY2 to generate tenth data DT10 corresponding to result-encrypted data. The third selector MX3 selects one of the ninth data DT9 and the tenth data DT10, in response to a third selection signal SEL3, and provides the selected signal as the fourth data DT4 to the first selector MX1 or as thirteenth data DT13 to a memory controller through a second path 26. The fourth selector MX4 provides eleventh data DT11 from the memory core MCR, in response to a fourth selection signal SEL4, as the twelfth data DT12 (which may be encrypted data) to the second selector MX2 or as the thirteenth data DT13 to the memory controller through the second path 26. The first decryptor DEC1 decrypts the thirteenth data DT13 based on the first security key KY1 to generate fourteenth data DT14. The input selector MXI selects one of the thirteenth data DT14 and the fourteenth data DT14 in response to an input selection signal SELI to output fifteenth data DT15.

In comparison with the second security engine 201 in FIG. 4, the second security engine 206 in FIG. 15 further includes the fifth selector MX5. A selector including the second selector MX2 and the fifth selector MX5 may provide received data (that is, the third data DT3 or the twelfth data DT12) to the second decryptor DEC2 when the received data correspond to the encrypted data, and provide the received data directly to the on-chip processor when the received data correspond to not-encrypted data.

Various combinations of a read operation, a write operation and a PIM may be performed for encrypted data or not-encrypted data using a configuration as illustrated in FIG. 15.

Figure 16:
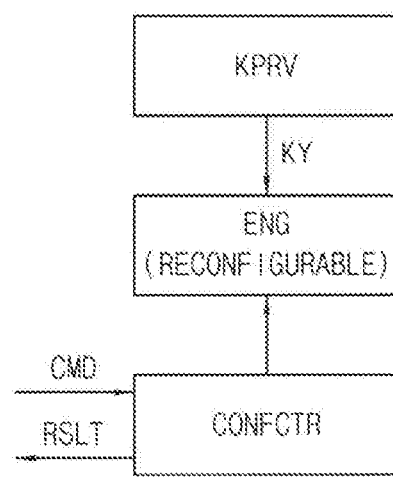
FIG. 16 is a diagram illustrating an example embodiment of a memory security controller included in a semiconductor memory device according to example embodiments.

FIG. 16 is a diagram illustrating an example embodiment of a memory security controller included in a semiconductor memory device according to example embodiments.

Referring to FIG. 16, a memory security controller 207 may include a key provider KPRV, a security engine ENG and a configuration controller CONFCTR. As described above, the key provider KPRV may, based on security information from a memory controller, store and provide a security key KY that is identical to a security key of the memory controller.

The security engine ENG may be implemented as a reconfigurable configuration. In some example embodiments, the security engine ENG may include a field-programmable gate array (FPGA). The configuration controller CONFCTR may, based on information from the memory controller, program the security engine ENG to have a configuration identical to a security engine of the memory controller. For example, the configuration controller CONFCTR may program the security engine ENG based on a command CMD from the memory controller and provide a result signal RSLT indicating success or fail of the programming to the memory controller. According to example embodiments, the programming of the security engine ENG may be performed during a chip packaging stage or a system assembly stage, and in this case the configuration controller CONFCTR may be omitted.

In some example embodiments, the security engine ENG may be implemented as a form of software. In this case, an instruction set for encryption algorithm may be provided from the memory controller to the semiconductor memory device, and the security engine may be implemented using the instruction set.

According to developments of hardware and software, demands on memory capacity and operation speed of a memory device are constantly increasing. Memory bandwidth and latency are performance bottlenecks in many processing systems. Memory capacity may be increased through the use of a stacked memory device in which a plurality of semiconductor devices are stacked in a package of a memory chip. The stacked semiconductor dies may be electrically connected through the use of through-silicon vias or through-substrate vias (TSVs). Such stacking technology may increase memory capacity and also suppress bandwidth and latency penalties. In general, system memory device and other large-scale memory typically are implemented as separate from the other components of the system. Each access of an external device to the stacked memory device requires data communication between the stacked semiconductor dies and thus penalty of the inter-device bandwidth and the inter-device latency may be caused twice for each access. Accordingly, the inter-device bandwidth and inter-device latency have a significant impact on processing efficiency and power consumption of the system when a task of the external device requires multiple accesses to the stacked memory device.

Hereinafter, example embodiments of a stacked semiconductor device and a system including the stacked semiconductor device are described.

Figure 17:
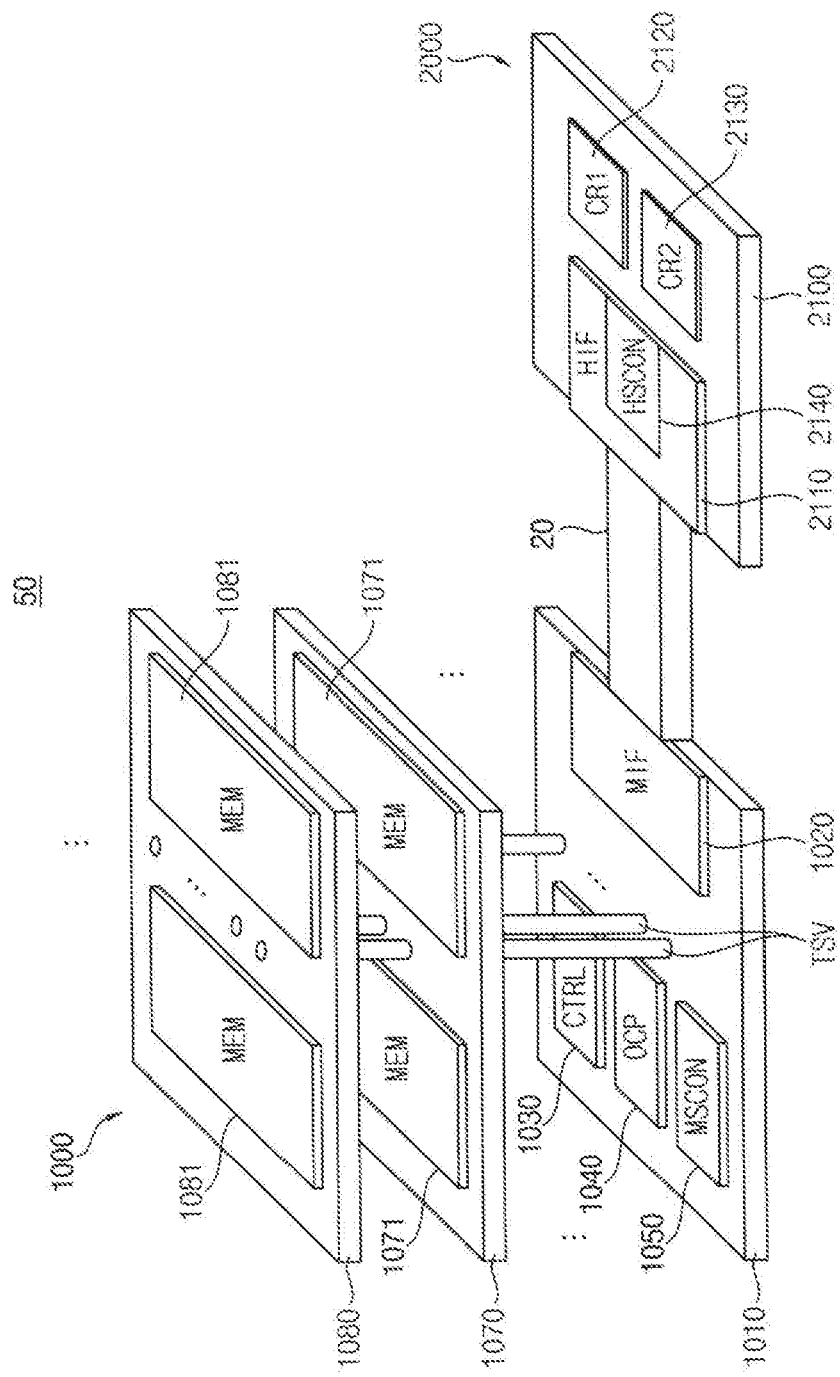
FIG. 17 is an exploded, perspective view, of a system including a stacked memory device according to example embodiments.

FIG. 17 is an exploded, perspective view, of a system including a stacked memory device according to example embodiments.

Referring to FIG. 17, a system 50 includes a stacked memory device 1000 and a host device 2000.

The stacked memory device 1000 may include a buffer semiconductor die or a logic semiconductor die 1010, a plurality of memory semiconductor dies 1070 and 1080 stacked with the buffer semiconductor die 1100, and through-silicon vias TSV electrically connecting the semiconductor die 1010, 1070 and 1080. The memory semiconductor dies 1070 and 1080 may include memory integrated circuits MEM 1071 and 1081, respectively. FIG. 17 illustrates a non-limiting example of one buffer semiconductor die and two memory semiconductor dies. For example, two or more logic semiconductor dies and one, three or more memory semiconductor dies may be included in the stack structure of FIG. 17. In addition, FIG. 17 illustrates a non-limiting example in that the memory semiconductor dies 1070 and 1080 are vertically stacked with the buffer semiconductor die 1010. As will be described below with reference to FIG. 19, the memory semiconductor dies 1070 and 1080 may be stacked vertically and the buffer semiconductor die 1010 may not be stacked with the memory semiconductor dies 1070 and 1080, but may be electrically connected to the memory semiconductor dies 1070 and 1080 through an interposer and/or a base substrate.

The buffer semiconductor die 1010 may include a memory interface MIF 1020, control circuit CTRL 1030, an on-chip processor OCP 1040 and a memory security controller MSCON 1050.

The memory interface 1020 may perform communication with an external device such as the host device 2000 through an interconnect device 20. The control circuit 1030 may control overall operations of the stacked memory device 1000. The on-chip processor 1040 performs a processing in memory (PIM). As described above, the memory security controller 1050 may be used to implement the decryption of data input to the PIM and the data encryption of the result data of the on-chip processor 1040.

The host device 2000 may include a host interface HIF 2110 and processor cores CR1 2120 and CR2 2130. The host interface 2110 may perform communication with an external device such as the stacked memory device 1000 through the interconnect device 12. The host device 2000 may include a host security controller HSCON as described above.

Figure 18:
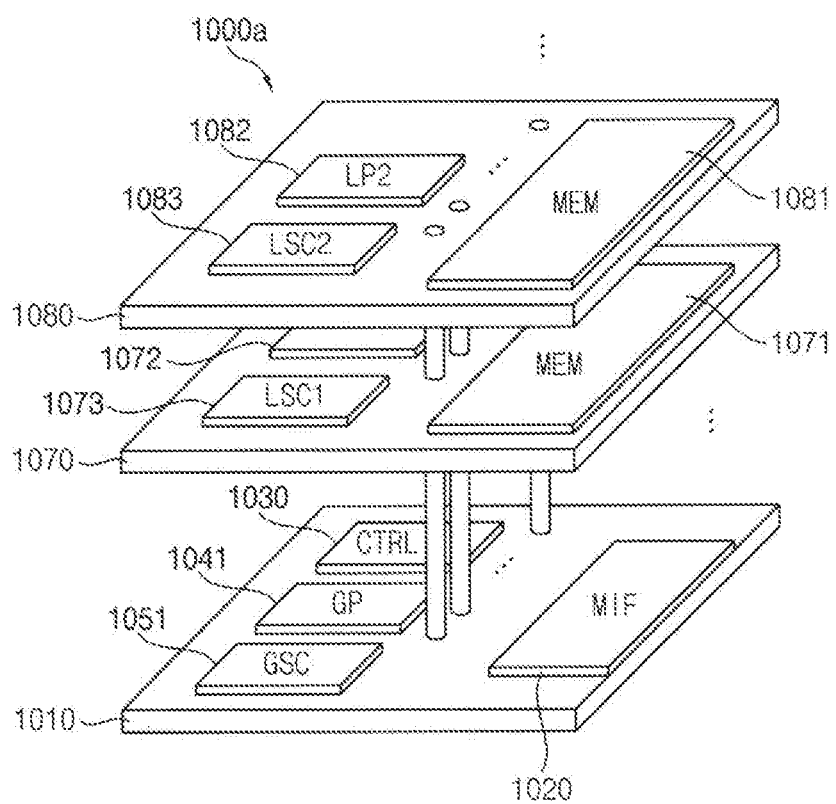
FIG. 18 is an exploded, perspective view, of a stacked memory device according to example embodiments.

FIG. 18 is an exploded, perspective view, of a stacked memory device according to example embodiments. The descriptions repeated with FIG. 17 may be omitted.

Referring to FIG. 18, a stacked memory device 1000a includes a buffer semiconductor die 1010, a plurality of memory semiconductor dies 1070 and 1080, and through-silicon vias TSV electrically connecting the semiconductor dies 1010, 1070 and 1080.

As illustrated in FIG. 18, a global processor GP 1041 may be formed in the buffer semiconductor die 1010. The global processor 1041 may perform a global sub process corresponding to a portion of a processing in memory (PIM). In addition, a global security controller GSC 1051 may be formed in the buffer semiconductor die 1010. The global security controller 1051 may perform encryption and decryption with respect to input and output data of the global processor 1041.

One or more local processors LP1 1072 and LP2 1082 may be formed respectively formed in the memory semiconductor dies 1070 and 1080. The local processors 1072 and 1072 may perform local sub processes corresponding to other portions of the PIM. In addition, one or more local security controllers LSC1 1073 and LSC2 1083 may be respectively formed in the memory semiconductor dies 1070 and 1080. The local security controllers 1073 and 1083 may perform encryption and decryption with respect to input and output data of the local processors 1073 and 1083.

As such, the PIM may be performed distributively using the global processor and the global security controller in the buffer semiconductor die and the local processors and the local security controllers in the memory semiconductor dies. Through the efficient combination of the PIM and the data security, the operation time and the power consumption may be reduced.

Figure 19:
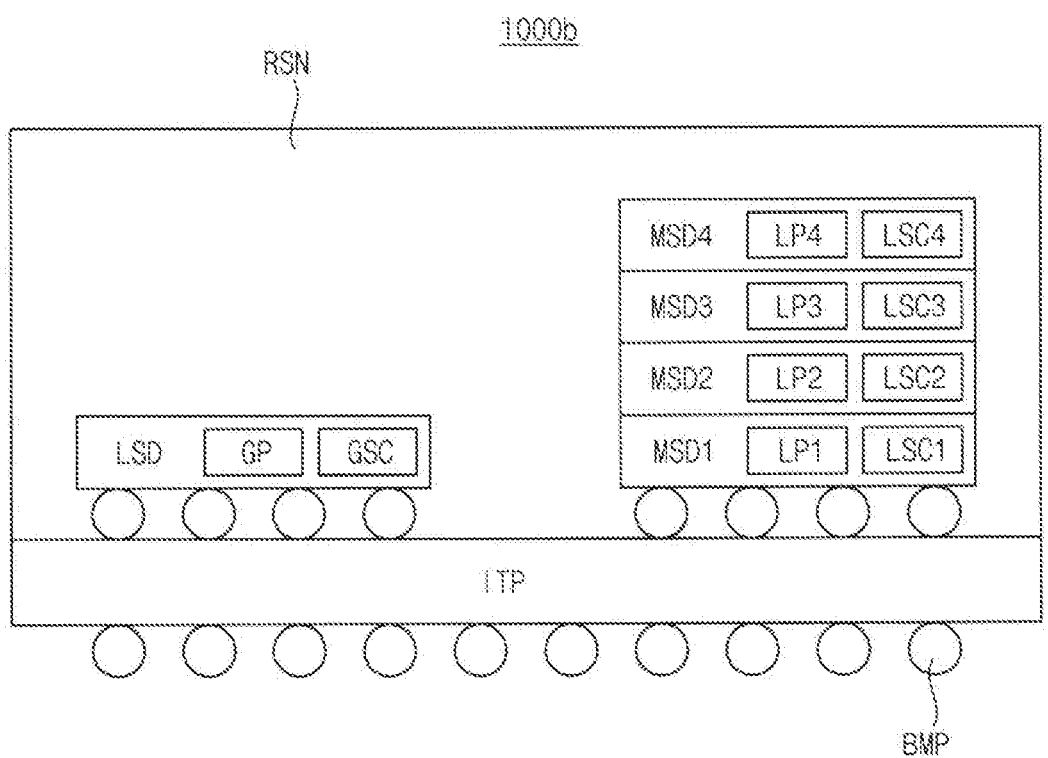
FIGS. 19 and 20 are diagrams illustrating packaging structures of a stacked memory device according to example embodiments.
Figure 20:
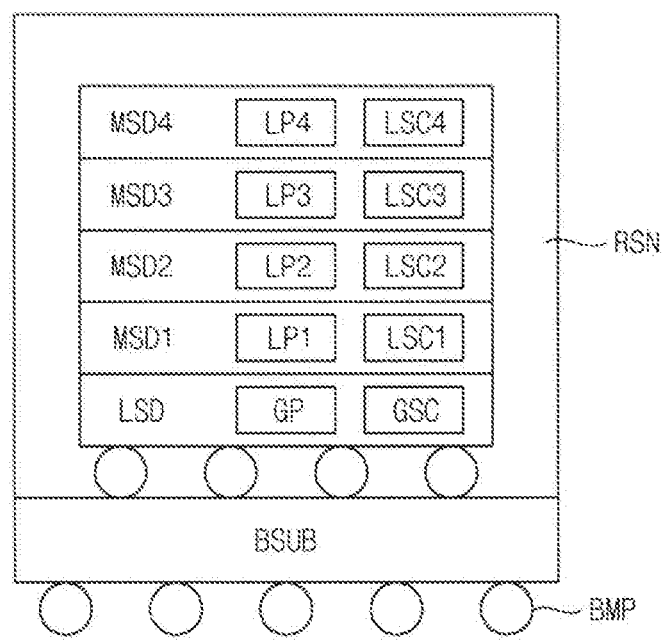

FIGS. 19 and 20 are diagrams illustrating packaging structures of a stacked memory device according to example embodiments.

Referring to FIG. 19, a memory device 1000b may be a memory package, and may include a base substrate or an interposer ITP and a stacked memory device stacked on the interposer ITP. The stacked memory device may include a logic semiconductor die LSD (or a buffer semiconductor die) and a plurality of memory semiconductor dies MSD1~MSD4.

Referring to FIG. 20, a memory device 1000c may be a memory package and may include a base substrate BSUB and a stacked memory device stacked on the base substrate BSUB. The stacked memory device may include a logic semiconductor die LSD and a plurality of memory semiconductor dies MSD1~MSD4.

FIG. 19 illustrates a structure in which the memory semiconductor dies MSD1~MSD4 except for the logic semiconductor die LSD are stacked vertically and the logic semiconductor die LSD is electrically connected to the memory semiconductor dies MSD1~MSD4 through the interposer ITP or the base substrate. In contrast, FIG. 20 illustrates a structure in which the logic semiconductor die LSD is stacked vertically with the memory semiconductor dies MSD1~MSD4.

A global processor GP and a global security controller GSC may be formed in the logic semiconductor die LSD and local processors LP1~LP4 and the local security controllers LSC1~LSC4 may be formed in the memory semiconductor dies MSD1~MSD4. Through such configuration, the distributive PIM of the encrypted data according to example embodiments may be performed.

The base substrate BSUB may be the same as the interposer ITP or include the interposer ITP. The base substrate BSUB may be a printed circuit board (PCB). External connecting elements such as conductive bumps BMP may be formed on a lower surface of the base substrate BSUB and internal connecting elements such as conductive bumps may be formed on an upper surface of the base substrate B SUB. In some example embodiments, the semiconductor dies LSD and MSD1~MSD4 may be electrically connected through through-silicon vias. In other example embodiments, the semiconductor dies LSD and MSD1~MSD4 may be electrically connected through the bonding wires. In still other example embodiments, the semiconductor dies LSD and MSD1~MSD4 may be electrically connected through a combination of the through-silicon vias and the bonding wires. In the example embodiment of FIG. 19, the logic semiconductor die LSD may be electrically connected to the memory semiconductor dies MSD1~MSD4 through conductive line patterns formed in the interposer ITP. The stacked semiconductor dies LSD and MSD1~MSD4 may be packaged using an encapsulant such as resin RSN.

Figure 21:
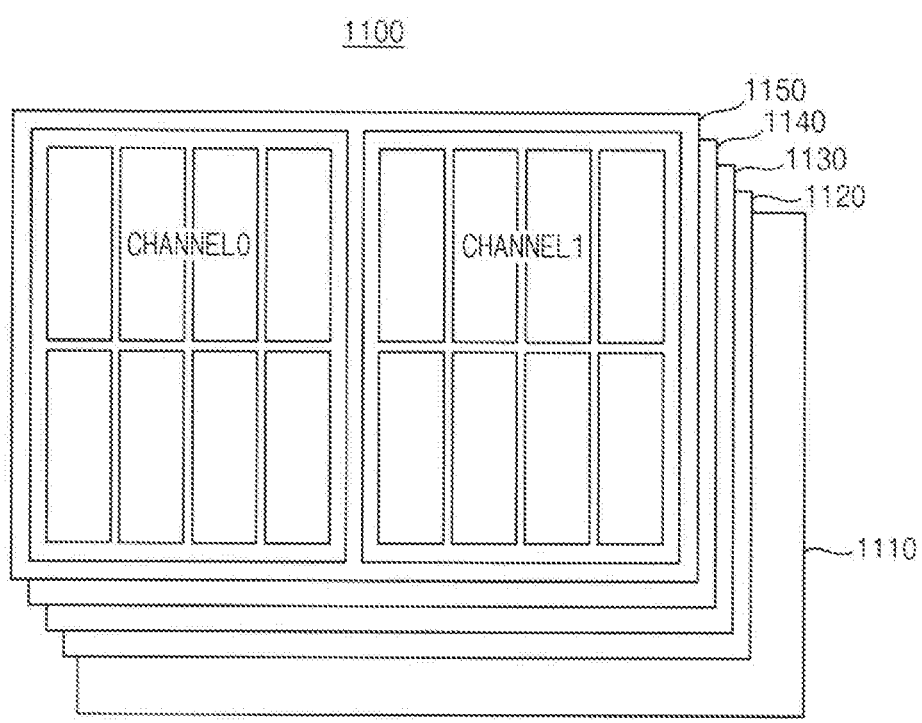
FIG. 21 is a diagram illustrating an example structure of a high bandwidth memory (HBM).

FIG. 21 is a diagram illustrating an example structure of a high bandwidth memory (HBM).

Referring to FIG. 21, a HBM 1100 may be configured to have a stack of multiple DRAM semiconductor dies 1120, 1130, 1140 and 1150. The HBM of the stack structure may be optimized by a plurality of independent interfaces called channels. Each DRAM stack may support up to 8 channels in accordance with the HBM standards. FIG. 21 shows an example stack containing 4 DRAM semiconductor dies 1120, 1130, 1140 and 1150, and each DRAM semiconductor die supports two channels CHANNEL0 and CHANNEL1.

Each channel provides access to an independent set of DRAM banks. Requests from one channel may not access data attached to a different channel. Channels are independently clocked, and need not be synchronous. The HBM 1100 may further include an interface die 1110 or a logic die disposed at bottom of the stack structure to provide signal routing and other functions. Some function for the DRAM semiconductor dies 1120, 1130, 1140 and 1150 may be implemented in the interface die 1110.

At least one of the DRAM semiconductor dies 1120, 1130, 1140 and 1150 may include an on-chip processor and a memory security controller according to example embodiments to perform the PIM of the encrypted data as described above.

Figure 22:
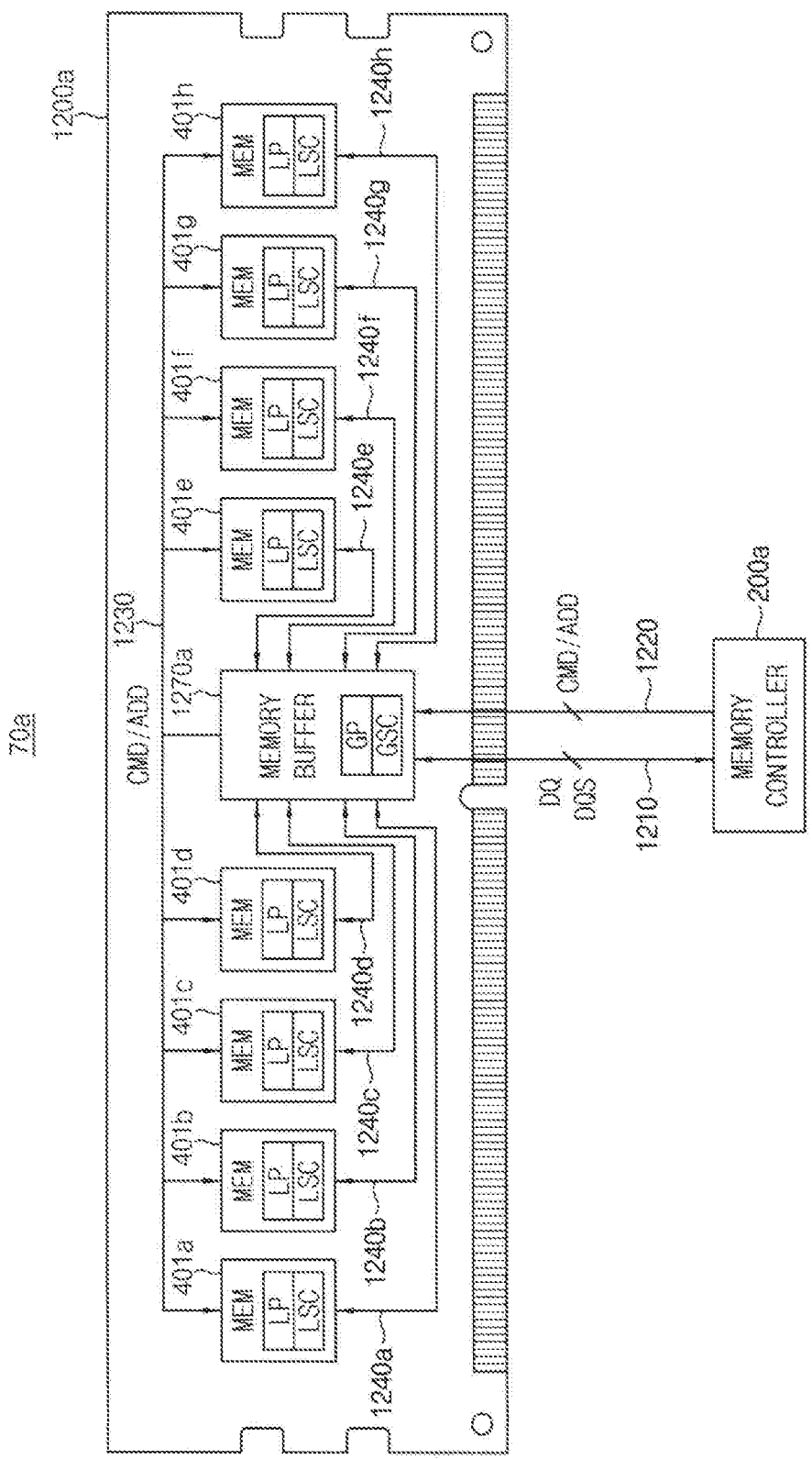
FIGS. 22, 23 and 24 are diagram illustrating a memory system according to example embodiments.
Figure 23:
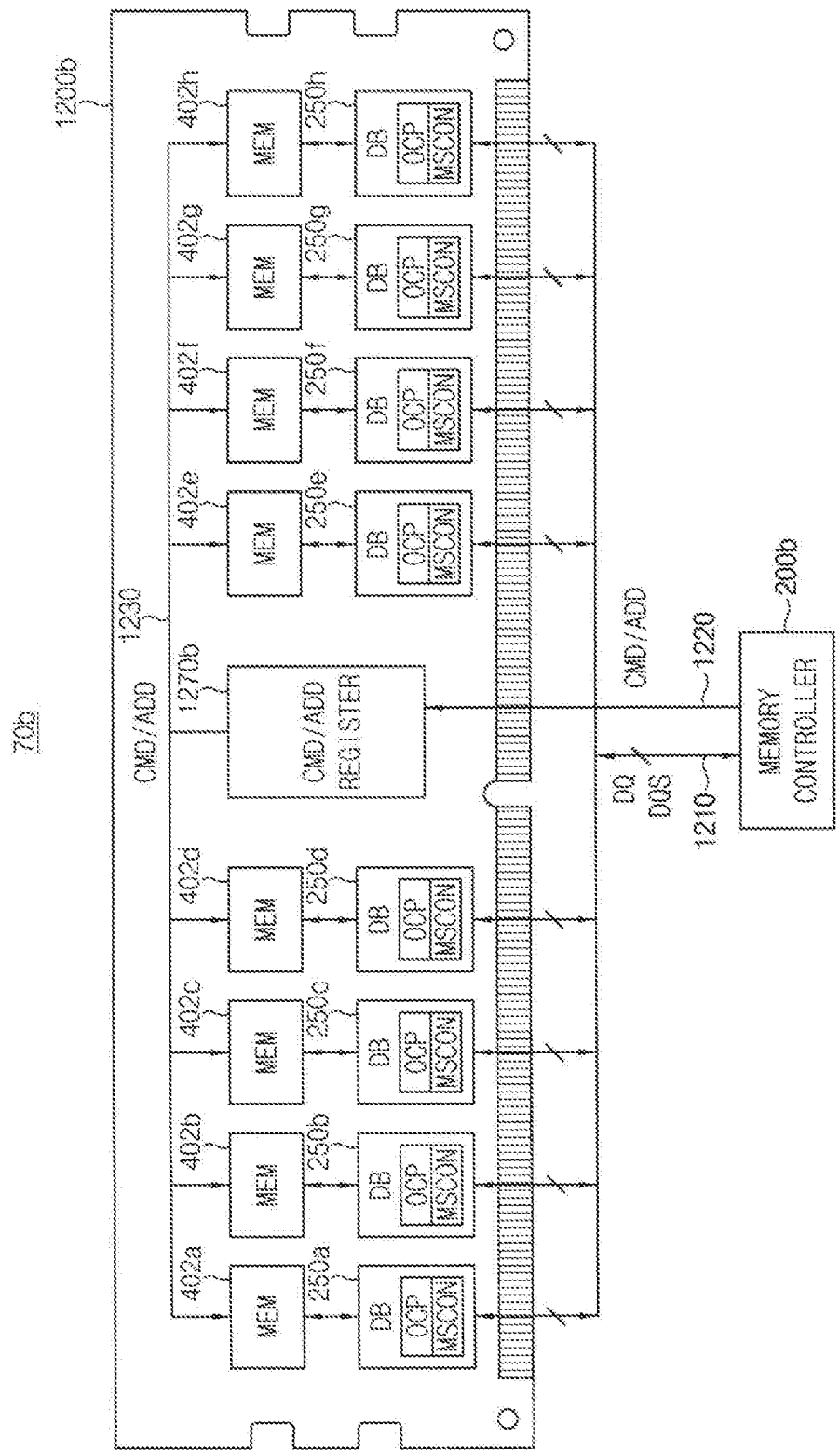
Figure 24:
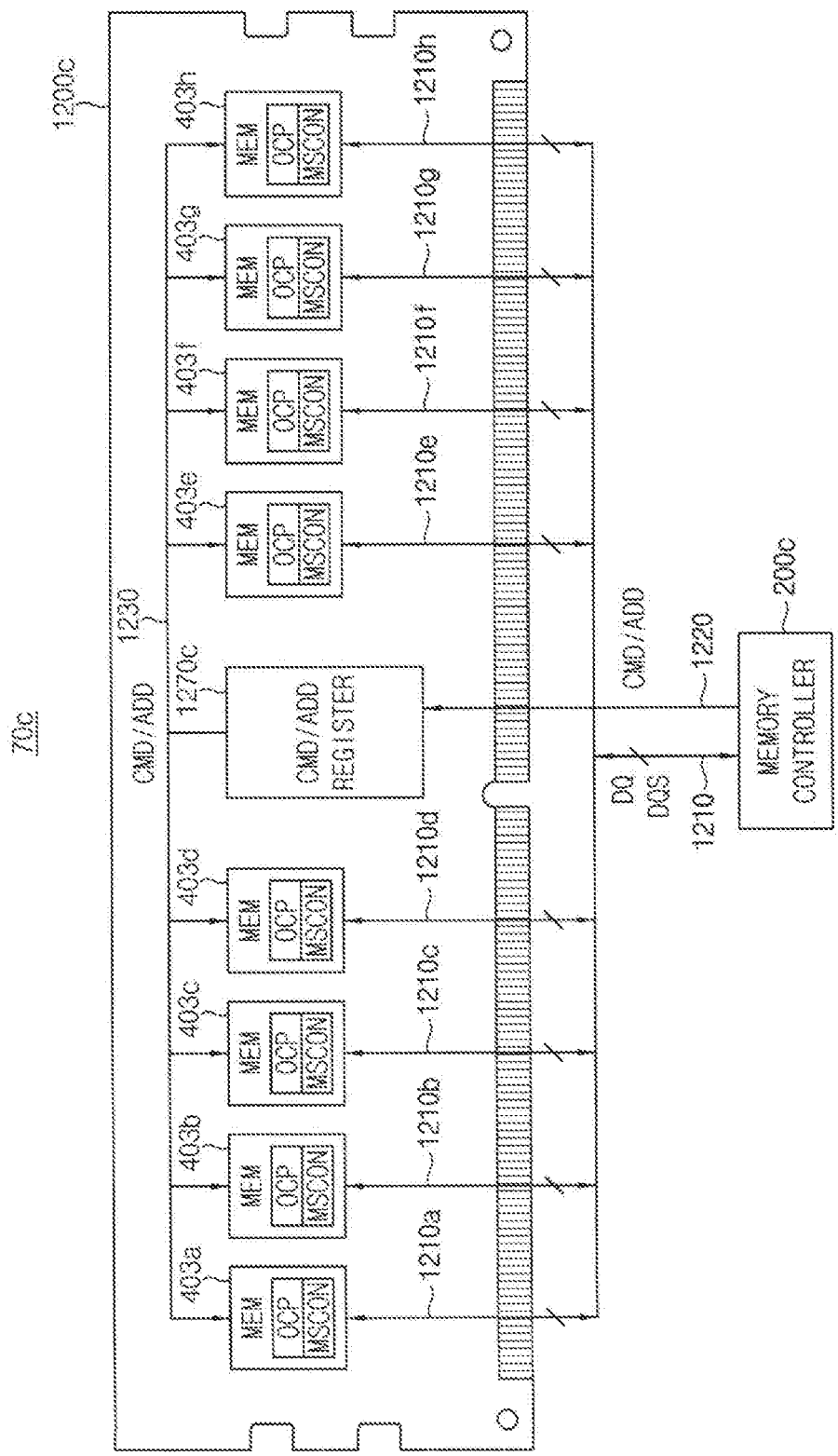

FIGS. 22, 23 and 24 are diagrams illustrating a memory system according to example embodiments.

As illustrated in FIGS. 22, 23 and 24, each of memory systems 70a, 70b and 70c may respectively include each of memory modules 1200a, 1200b and 1200c and each of memory controllers 200a, 200b and 200c. Each of the memory modules 1200a, 1200b and 1200c may include a module substrate and a plurality of memory chips 401a~401h that are mounted on the module substrate. FIGS. 22, 23 and 24 illustrate a non-limiting example of eight memory chips 401a~401h, however the number of memory chips included in each memory module may be determined variously.

Referring to FIG. 22, the memory module 1200a may be connected to the memory controller 200a via a data bus 1210 and a control bus 1220. The memory module 1200a may be inserted into a socket connector of a larger memory system or computational system. Electric connectors (or pins) of the memory module 1200a may be connected to electric contacts of the socket connector. The electric connectors and the buses 1210 and 1220 connected to the electric contacts allow direct access to a memory buffer or a buffer chip 1270a and indirect access to the memory chips 401a~401h of the memory module 1200a. The data bus 1210 may include signal lines (conductive wiring) to transfer data signals DQ and data strobe signals DQS, and the control bus 1220 includes at least one of a command (CMD) line and/or address (ADD) line.

The data bus 1210 and control bus 1220 are directly connected to the buffer chip 1270a via the respective socket/pin and bus signal line arrangements. In turn, the buffer chip 1270a is connected to the respective memory chips 401a~401h via at least a commonly-connected first bus 1230 and separately connected second buses 1240a~1240h from specified ports of the buffer chip 1270a to corresponding ports of the memory chips 401a~401h. The buffer chip 1270a may be used to transfer a received command and/or address received from the memory controller 200a via the control bus 1220 to the respective memory chips 401a~401h via the first bus 1230.

The buffer chip 1270a may transfer write data DQ (i.e., data to be written to one or more of the memory chips 400a~400h) and the data strobe signal DQS received from the memory controller 200a via the data bus 1210 to the memory chips 401a~401h via the respective second buses 1240a~1240h. Alternately, the buffer chip 1270a may transfer read data DQ (data retrieved from one or more of the memory chips 401a~401h) obtained from one or more of the memory chips 401a~401h via the second buses 1240a~1240h to the memory controller 200a via the data bus 1210.

The buffer chip 1270a may additionally include a global processor GP and a global security controller GSC as described above and the memory chips 400a~400h may include local processors LP and local security controllers LSC as described above.

Referring to FIG. 23, a memory module 1200b includes a plurality of memory chips 402a~402h, a command (CMD)/address (ADD) register chip 1270b, and data buffer chips 250a~250h respectively connected to the memory chips 402a~402h. The CMD/ADD register chip 1270b receives command and address information from the memory controller 200b via the control bus 1220, then buffers/re-drives the command and address information. The command and address information output from the CMD/ADD register chip 1270b is provided to the memory chips 402a~402h via the commonly-connected first bus 1230.

The data buffer chips 250a~250h are respectively connected between the memory chips 402a~402h. Each of the data buffer chips 250a~250h is configured to receive and provide the write data signals DQ and the data strobe signal DQS to a corresponding one of the memory chips 402a~402h, as communicated by the memory controller 200b via the data bus 1210. In analogous manner, each of the data buffer chips 250a~250h may be used to receive, buffer and transfer read data signal DQ and the data strobe signal DQS retrieved from its corresponding one of the memory chips 402a~402h to the memory controller 200b via the data bus 1210.

Each of the data buffer chips 250a~250h may include an on-chip processor OCP and a memory security controller MSCON as described above.

Referring to FIG. 24, a memory module 1200c includes a plurality of memory chips 403a~403h and the CMD/ADD register chip 1270c. As described above, the CMD/ADD register chip 1270c receives command and address information from the memory controller 200c via the control bus 1220, then buffers and re-drives the command and address information. The command and address information provided by the CMD/ADD register chip 1270c may be communicated to the respective memory chips 403a~403h via the first bus 230.

Each of the memory chips 403a~403h is connected to the memory controller 200c via a corresponding one of a plurality of data buses 1210a~1210h, whereby each memory chip is directly wired to the memory controller 200c for receipt and transfer of data signals DQ and data strobe signals DQS. Each of the memory chips 403a~403h may receive the write data signal DQ and the data strobe signal DQS from the memory controller 200c via a corresponding one of the data buses 1210a~1210h respectively connected to the memory chips 403a~403h, and the read data signal DQ and the data strobe signal DQS retrieved from each of the memory chips 403a~403h may also be transferred to the memory controller 200c via one of the data buses 1210a~1210h.

Each of the memory chips 403a~403h may include an on-chip processor OCP and a memory security controller MSCON as described above.

Figure 25:
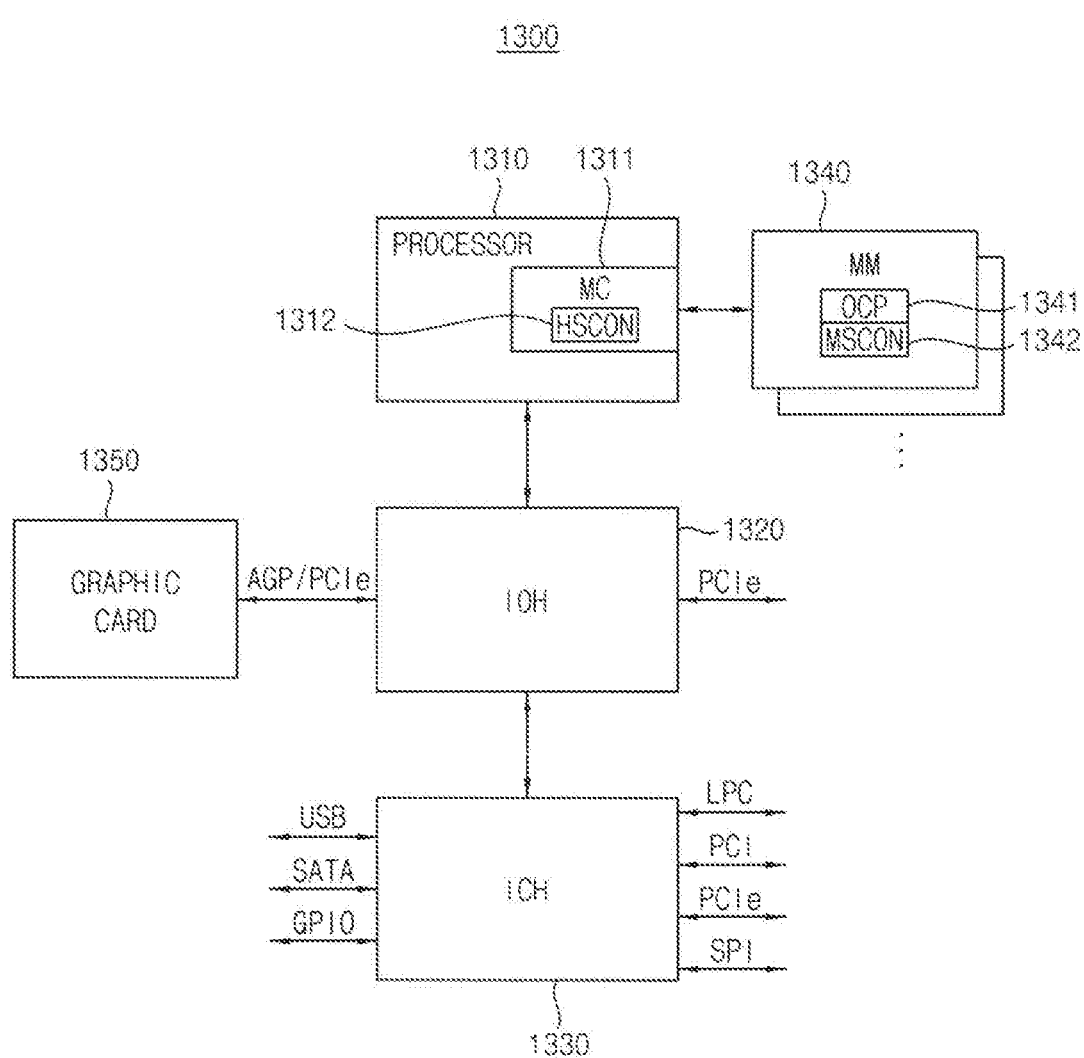
FIG. 25 is a block diagram illustrating a computing system according to example embodiments.

FIG. 25 is a block diagram illustrating a computing system according to example embodiments.

Referring to FIG. 25, a computing system 1300 includes a processor 1310, an input/output hub (IOH) 1320, an input/output controller hub (ICH) 1330, at least one memory module 1340, and a graphics card 1350.

The processor 1310 may perform various computing functions such as executing specific software for performing specific calculations or tasks. The processor 1310 may include a memory controller MC 1311 for controlling operations of the memory module 1340. The memory controller 1311 may include a host security controller HSCON 1312 as described above. The memory module 1340 may include at least one memory chip, an on-chip processor OCP 1341 and a memory security controller MSCON 1342 as described above. According to example embodiments, the memory security controller 1342 may perform the same encryption and decryption as the host security controller 1312 to support the PIM of the on-chip processor 1341.

The input/output hub 1320 may manage data transfer between processor 1310 and devices, such as the graphics card 1350. The input/output hub 1320 may be coupled to the processor 1310 via various interfaces. For example, the interface between the components and the input/output hub 1320 may be an accelerated graphics port (AGP) interface, a peripheral component interface-express (PCIe), a communications streaming architecture (CSA) interface, etc. The graphic card 1350 may be coupled to the input/output hub 1320 via AGP or PCIe. The graphics card 1350 may control a display device (not shown) for displaying an image.

The input/output controller hub 1330 may perform data buffering and interface arbitration to efficiently operate various system interfaces. The input/output controller hub 1330 may be coupled to the input/output hub 1320 via an internal bus, such as a direct media interface (DMI), a hub interface, an enterprise Southbridge interface (ESI), PCIe, etc. The input/output controller hub 1330 may provide various interfaces with peripheral devices. For example, the input/output controller hub 1330 may provide a universal serial bus (USB) port, a serial advanced technology attachment (SATA) port, a general purpose input/output (GPIO), a low pin count (LPC) bus, a serial peripheral interface (SPI), PCI, PCIe, etc.

As described above, the semiconductor memory device, the memory system and the memory module according to example embodiments may enhance data processing efficiency without degradation of data security by decrypting the encrypted data in the semiconductor memory device to perform processing-in-memory (PIM).

The present inventive concept may be applied to any electronic devices and systems requiring the PIM of the encrypted data. For example, the present inventive concept may be applied to systems such as be a memory card, a solid state drive (SSD), an embedded multimedia card (eMMC), a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. A memory system comprising:
   a semiconductor memory device;
   a memory controller external to the semiconductor memory device and configured to issue an operation command and an address to the semiconductor memory device to write data in the semiconductor memory device and read data from the semiconductor memory device; and
   a channel through which data sent between the semiconductor memory device and the memory controller is transmitted,
   wherein the memory controller includes:
   a host security controller configured to encrypt write data to be stored in the semiconductor memory device to generate encrypted data, and to decrypt the encrypted data read from the semiconductor memory device, and
   wherein the semiconductor memory device includes:
   a memory core including a plurality of memory cells;
   an on-chip processor configured to perform on-chip data processing; and
   a memory security controller configured to decrypt the encrypted data provided from the memory core or from the memory controller and to provide the decrypted data to the on-chip processor, to receive unencrypted result data from the on-chip processor, the result data based on the decrypted data, and to encrypt the result data received from the on-chip processor and provide the result-encrypted data to the memory core or the memory controller.

2. The memory system of claim 1, wherein the memory security controller includes:
a key provider configured to provide a security key; and
a security engine configured to decrypt the encrypted data based on the security key in order to generate the decrypted data, and configured to encrypt the result data based on the security key to generate the result-encrypted data.

3. The memory system of claim 2, wherein the key provider stores and provides the security key identical to a security key of the memory controller based on security information provided from the memory controller such that the security engine performs encryption and decryption identical to encryption and decryption performed in the memory controller.

4. The memory system of claim 2, further comprising:
a selector configured to provide received data to a decryptor in the security engine when the received data corresponds to the encrypted data, and provide the received data directly to the on-chip processor when the received data corresponds to not-encrypted data.

5. The memory system of claim 2, wherein the security engine has a reconfigurable configuration and the security engine is programmed to have a configuration identical to a security engine of the memory controller.

6. The memory system of claim 1, wherein the memory controller further includes:
a first key provider configured to provide a first security key; and
wherein the host security controller includes:
a first security engine configured to perform encryption and decryption with respect to input data based on the first security key.

7. The memory system of claim 6, wherein the memory security controller includes:
a second key provider configured to provide a second security key that is identical to the first security key; and
a second security engine configured to perform encryption and decryption identical to the encryption and decryption of the memory controller based on the second security key.

8. The memory system of claim 7, wherein the first key provider includes:
a first key register configured to store and provide the first security key, and wherein the second key provider includes:
a second key register configured to receive the first security key from the memory controller to store and provide the first security key as the second security key.

9. The memory system of claim 7, wherein the first key provider includes:
a first seed register configured to store and provide a first seed value;
a first on-chip timer configured to provide a first time information;
a first key generator configured to generate the first security key based on the first seed value and the first time information; and
a first key register configured to store and provide the first security key.

10. The memory system of claim 9, wherein the second key provider includes:
a second seed register configured to receive the first seed value from the first seed register to store and provide the first seed value as a second seed value;
a second on-chip timer configured to provide a second time information, the second on-chip timer being synchronized with the first on-chip timer;
a second key generator configured to generate the second security key based on the second seed value and the second time information; and
a second key register configured to store and provide the second security key.

11. The memory system of claim 9, wherein the second key provider includes:
a second seed register configured to receive the first seed value from the first seed register to store and provide the first seed value as a second seed value;
a second key generator configured to generate the second security key based on the second seed value and the first time information provided from the first on-chip timer; and
a second key register configured to store and provide the second security key.

12. The memory system of claim 7, wherein the first key provider includes:
a first seed register configured to store and provide a first seed value;
a first key generator configured to generate the first security key based on the first seed value and a time information provided from a system timer; and
a first key register configured to store and provide the first security key, and wherein the second key provider includes:
a second seed register configured to receive the first seed value from the first seed register to store and provide the first seed value as a second seed value;
a second key generator configured to generate the second security key based on the second seed value and the time information provided from the system timer; and
a second key register configured to store and provide the second security key.

13. The memory system of claim 1, wherein, when the semiconductor memory device receives a processing and write command from the memory controller, the semiconductor memory device decrypts the encrypted data provided from the memory controller to perform the on-chip data processing with respect to the decrypted data and encrypts the result data of the on-chip data processing to write the result-encrypted data in the memory core.

14. The memory system of claim 1, wherein, when the semiconductor memory device receives a processing and read command from the memory controller, the semiconductor memory device decrypts the encrypted data read from the memory core to perform the on-chip data processing with respect to the decrypted data and encrypts the result data of the on-chip data processing to provide the result-encrypted data to the memory controller.

15. The memory system of claim 1, wherein, when the semiconductor memory device receives an internal processing command from the memory controller, the semiconductor memory device decrypts the encrypted data read from the memory core to perform the on-chip data processing with respect to the decrypted data and encrypts the result data of the on-chip data processing to write the result-encrypted data in the memory core.

16. A memory system comprising:
a semiconductor memory device;
a memory controller configured to issue an operation command and an address to the semiconductor memory device to write data in the semiconductor memory device and read data from the semiconductor memory device; and
a channel through which data sent between the semiconductor memory device and the memory controller is transmitted,
wherein the memory controller includes:
a host security controller configured to encrypt write data to be stored in the semiconductor memory device to generate encrypted data and decrypt the encrypted data read from the semiconductor memory device, and
wherein the semiconductor memory device includes:
a buffer semiconductor die;
a plurality of memory semiconductor dies stacked with the buffer semiconductor die, each memory semiconductor die including a memory cell array;
through-silicon vias electrically connecting the buffer semiconductor die and the plurality of memory semiconductor dies;
an on-chip processor formed in a first memory semiconductor die of the memory semiconductor dies, configured to perform on-chip data processing with respect to input data in order to provide result data; and
a memory security controller formed in the first memory semiconductor die and configured to decrypt the encrypted data, to provide the decrypted data as the input data to the on-chip processor, to received unencrypted result data from the on-chip processor, which result data is based on the input data, to encrypt the result data from the on-chip processor to form re-encrypted data, and to provide the re-encrypted data to the first memory semiconductor die.

17. The memory system of claim 16, wherein the on-chip processor and the memory security controller are additionally formed in the buffer semiconductor die.

18. The memory system of claim 17, wherein the on-chip processor includes:
a global processor formed in the buffer semiconductor die and configured to perform a global sub process corresponding to a portion of the on-chip data processing; and
one or more local processors respectively formed in the memory semiconductor dies and configured to perform local sub processes corresponding to other portions of the on-chip data processing.

19. The memory system of claim 18, wherein the memory security controller includes:
a global security controller formed in the buffer semiconductor die and configured to perform encryption and decryption with respect to input and output data of the global processor; and
one or more local security controllers respectively formed in the memory semiconductor dies and configured to perform encryption and decryption with respect to input and output data of the local processors.

20. A method of performing secure operations for a semiconductor memory device having at least a first memory chip having a memory core including a plurality of memory cells, the method comprising:
issuing, at a memory controller external to the semiconductor device, an operation command and an address to the semiconductor memory device to write data in the semiconductor memory device and read data from the semiconductor memory device;
based on the operation command and the address, encrypting, at the memory controller, write data to be stored in the semiconductor memory device to generate encrypted data;
decrypting, at the memory controller, the encrypted data read from the semiconductor memory device and transmitted through a channel connecting the memory controller and the semiconductor memory device;
decrypting, at the first memory chip, the encrypted data provided from the memory core or from the memory controller;
performing an on-chip processing operation by an on-chip processor of the first memory chip, by receiving the decrypted data, and outputting an unencrypted result data, the result data based on the decrypted data; and
encrypting, at the first memory chip, the result data from the on-chip processor to provide respective result-encrypted data to the memory core.

* * * * *